US012320098B2

(12) United States Patent
Hijikata et al.

(10) Patent No.: US 12,320,098 B2
(45) Date of Patent: Jun. 3, 2025

(54) WORK MACHINE

(71) Applicant: Hitachi Construction Machinery Co., Ltd., Tokyo (JP)

(72) Inventors: Seiji Hijikata, Tsukuba (JP); Yasutaka Tsuruga, Ryugasaki (JP); Masatoshi Hoshino, Tsuchiura (JP); Shou Furukawa, Tsuchiura (JP); Ryou Yagisawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/688,633

(22) PCT Filed: Mar. 16, 2023

(86) PCT No.: PCT/JP2023/010452

§ 371 (c)(1),
(2) Date: Mar. 1, 2024

(87) PCT Pub. No.: WO2023/189681

PCT Pub. Date: Oct. 5, 2023

(65) Prior Publication Data

US 2024/0368857 A1 Nov. 7, 2024

(30) Foreign Application Priority Data

Mar. 31, 2022 (JP) ................................ 2022-059729

(51) Int. Cl.

*E02F 9/22* (2006.01)
*E02F 9/08* (2006.01)
*F15B 1/02* (2006.01)

(52) U.S. Cl.

CPC .......... *E02F 9/2203* (2013.01); *E02F 9/0883* (2013.01); *E02F 9/2217* (2013.01);
(Continued)

(58) Field of Classification Search

CPC ..... E02F 9/2282; E02F 9/2217; E02F 9/2203; F15B 1/024
See application file for complete search history.

(56) References Cited

U.S. PATENT DOCUMENTS 8,910,474 B2 * 12/2014 Knussman .............. F15B 7/003 60/421
2013/0312399 A1 * 11/2013 Hiraku .................. E02F 9/2217 60/422
(Continued)

FOREIGN PATENT DOCUMENTS

JP 63-9359 U 1/1988
JP 9-125465 A 5/1997
(Continued)

OTHER PUBLICATIONS

International Search Report (PCT/ISA/210) issued in PCT Application No. PCT/JP2023/010452 dated Apr. 25, 2023 with English translation (4 pages).
(Continued)

*Primary Examiner* — Abiy Teka
(74) *Attorney, Agent, or Firm* — Crowell & Moring LLP

(57) ABSTRACT

Provided is a work machine including a flow control valve serving as a flow control mechanism that controls a flow rate of pressurized fluid from a hydraulic pump to a hydraulic actuator via a first control valve. A controller of the work machine, when the pressurized fluid is supplied to the hydraulic actuator from only an accumulator, drives a second control valve such that a meter-in side of the hydraulic actuator and the accumulator are connected to each other, drives the first control valve such that a meter-out side of the hydraulic actuator and a tank are connected to each other, and drives the flow rate control mechanism such that a flow
(Continued)

of the pressurized fluid from the hydraulic pump to the hydraulic actuator via the first control valve is interrupted.

5 Claims, 13 Drawing Sheets

(52) U.S. Cl.
CPC ............ *E02F 9/2282* (2013.01); *F15B 1/024* (2013.01); *E02F 9/2292* (2013.01); *E02F 9/2296* (2013.01)

(56) References Cited

U.S. PATENT DOCUMENTS

| | | | | |
|---|---|---|---|---|
| 2020/0232488 | A1* | 7/2020 | Hijikata | F15B 11/17 |
| 2021/0364015 | A1 | 11/2021 | Shimada | |

FOREIGN PATENT DOCUMENTS

| | | | |
|---|---|---|---|
| JP | 9-158248 | A | 6/1997 |
| WO | WO 2018/061165 | A1 | 4/2018 |
| WO | WO 2019/198579 | A1 | 10/2019 |

OTHER PUBLICATIONS

Japanese-language Written Opinion (PCT/ISA/237) issued in PCT Application No. PCT/JP2023/010452 dated Apr. 25, 2023 with English translation (6 pages).

International Preliminary Report on Patentability (PCT/IB/338 & PCT/IB/373) issued in PCT Application No. PCT/JP2023/010452 dated Oct. 10, 2024, including English translation of Written Opinion (PCT/ISA/237) (5 pages).

* cited by examiner

FIG. 7

| NO | ACTION | PUMP/ACC CONNECTION DESTINATIONS | | |
|---|---|---|---|---|
| | | PUMP 1 | PUMP 2 | ACC |
| 1 | EXCAVATION | BK/BM | AM | |
| 2 | SWING BOOM RAISING | (BM) | SW | BM |
| 3 | SOLO BOOM RAISING | BM | BM | BM |

WORK MACHINE

TECHNICAL FIELD

The present invention relates to a work machine and more particularly to a work machine provided with an accumulator in addition to a hydraulic pump as a hydraulic fluid source which supplies pressurized fluid to a hydraulic actuator.

BACKGROUND ART

Among work machines such as a hydraulic excavator and a crane, there exists a work machine which includes an accumulator for accumulating pressurized fluid delivered from a hydraulic pump in order to reduce a loss in the hydraulic pump and an actuator operated by the pressurized fluid from the hydraulic pump and the accumulator, accumulates part of the pressurized fluid delivered by the hydraulic pump in the accumulator when power required to drive the actuator is low, and supplies the pressurized fluid accumulated in the accumulator to the actuator when the power required to drive the actuator is high. As such a work machine, for example, there is known a work machine provided with a hydraulic drive system described in Patent Document 1. The hydraulic drive system for the work machine described in Patent Document 1 includes one circuit which directly supplies pressurized fluid from a hydraulic pump to a hydraulic actuator via a valve (flow control valve) and another circuit which supplies the pressurized fluid accumulated in an accumulator to the hydraulic actuator via another valve (flow control valve), and can supply the pressurized fluid from a circuit (the one circuit or the other circuit) having a higher efficiency to the hydraulic actuator according to an action of the work machine.

PRIOR ART DOCUMENT

Patent Document

Patent Document 1: WO-2018-061165-A1

SUMMARY OF THE INVENTION

Problem to be Solved by the Invention

In the hydraulic drive system of the work machine described in Patent Document 1, in addition to the valve for the one circuit which directly supplies the pressurized fluid from the hydraulic pump to the hydraulic actuator, there is added the other valve for the other circuit which supplies the pressurized fluid accumulated in the accumulator to the hydraulic actuator. Moreover, in addition to a return hydraulic line (a line which connects flow control valves 8 and 9 and a tank in FIG. 4 of Patent Document 1 to each other) for returning return fluid discharged from the hydraulic actuator to the tank via the valve (flow control valve) of the one circuit, a return hydraulic line (a line which connects a flow control valve 20 and the tank of FIG. 4 to each other) for returning the return fluid to the tank via the other valve (flow control valve) of the other circuit is also added. With this structure, in a case in which it is required to control a meter-out flow rate when the pressurized fluid is supplied from the accumulator to the hydraulic actuator through the other valve of the other circuit, it is required to further add a flow control valve to the return hydraulic line connected to the other valve. As described above, when the accumulator is added as a hydraulic fluid source which supplies the pressurized fluid to the hydraulic actuator, there poses such a problem that the structure of the hydraulic system becomes complicated as a result of providing the return hydraulic line and the flow control valve (the circuit on the meter-out side) to the valve (flow control valve) for supplying the pressurized fluid from the accumulator to the hydraulic actuator.

The present invention has been made to solve the problem described above and has an object to provide a work machine capable of suppressing an increase in complexity of a structure in a hydraulic system capable of supplying pressurized fluid from an accumulator, in addition to a hydraulic pump, to a hydraulic actuator.

Means for Solving the Problem

The present application includes a plurality of means for solving the problem described above. As an example thereof, in a work machine including a hydraulic pump that delivers pressurized fluid, a hydraulic actuator that is driven by the pressurized fluid delivered from the hydraulic pump, a tank that stores return fluid discharged from the hydraulic actuator, an accumulator that accumulates the pressurized fluid delivered from the hydraulic pump and supplies the accumulated pressurized fluid to the hydraulic actuator, a first control valve that controls connection between a meter-in side of the hydraulic actuator and the hydraulic pump and controls connection between a meter-out side of the hydraulic actuator and the tank, and a second control valve that controls connection between the meter-in side of the hydraulic actuator and the accumulator, the work machine further includes a flow control mechanism that controls a flow rate of the pressurized fluid from the hydraulic pump to the hydraulic actuator via the first control valve and a controller that controls the first control valve, the second control valve, and the flow control mechanism, and the controller is configured to, when the pressurized fluid is supplied from only the accumulator to the hydraulic actuator, drive the second control valve such that the meter-in side of the hydraulic actuator and the accumulator are connected to each other, drive the first control valve such that the meter-out side of the hydraulic actuator and the tank are connected to each other, and drive the flow control mechanism such that a flow of the pressurized fluid from the hydraulic pump to the hydraulic actuator via the first control valve is interrupted.

Advantages of the Invention

According to the present invention, when the pressurized fluid is supplied from only the accumulator to the hydraulic actuator, the meter-out side of the hydraulic actuator and the tank are connected to each other by the drive of the first control valve, and the flow of the pressurized fluid from the hydraulic pump to the hydraulic actuator via the first control valve is interrupted by the drive of the flow control mechanism. Hence, even when the pressurized fluid is supplied from the accumulator to the hydraulic actuator, the return fluid of the hydraulic actuator can be discharged to the tank via the first control valve. That is, the control of the flow of the meter-out side of the hydraulic actuator can be achieved by only the first control valve. Therefore, it is not required to provide a circuit for the meter-out such as a return hydraulic line and a flow control valve to the second control valve, and hence, it is possible to suppress the increase in complexity of the structure in the hydraulic system capable of supplying the pressurized fluid from the accumulator, in addition to the hydraulic pump, to the hydraulic actuator.

Problems, structures, and effects other than those given above become apparent from the following description of embodiments.

BRIEF DESCRIPTION OF THE DRAWINGS

FIG. 7 is a table used by an action pattern computation section of the controller according to the first embodiment illustrated in FIG. 6.

MODES FOR CARRYING OUT THE INVENTION

A description is now given of embodiments of a work machine according to the present invention with reference to the drawings. In the embodiments, the description is given while, as an example of the work machine, a hydraulic excavator is exemplified.

First Embodiment

Figure 1:
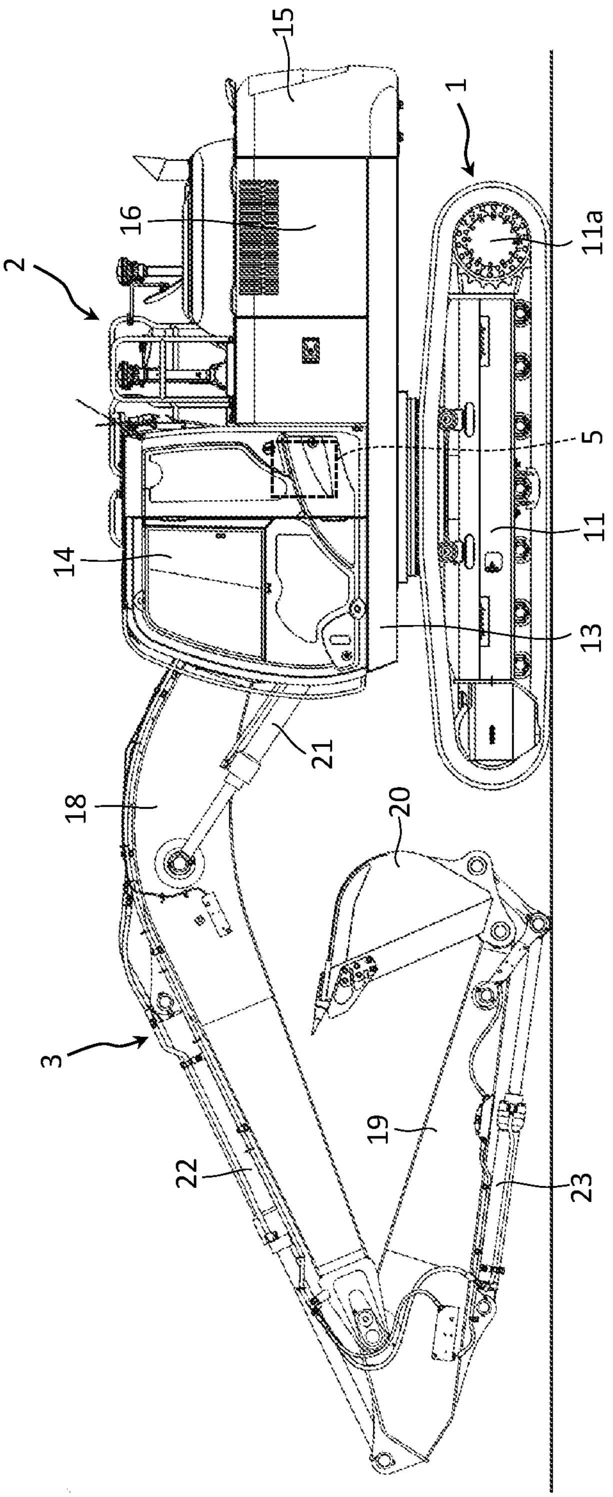
FIG. 1 is an exterior view for illustrating a hydraulic excavator as a work machine according to a first embodiment of the present invention.

First, a schematic structure of the hydraulic excavator as the work machine according to the first embodiment of the present invention is described with reference to FIG. 1. FIG. 1 is an exterior view for illustrating the hydraulic excavator as the work machine according to the first embodiment of the present invention. The description herein is given using a direction viewed from an operator seated on an operator's seat.

In FIG. 1, the hydraulic excavator as the work machine includes a self-propelled lower track structure 1, an upper swing structure 2 mounted on the lower track structure 1 so as to swing, and a front work implement 3 provided to a front portion of the upper swing structure 2 so as to allow an upward and downward movement. The upper swing structure 2 is structured to execute a swing action with respect to the lower track structure 1 by a swing hydraulic motor 5 being a hydraulic actuator.

The lower track structure 1 includes, for example, track devices 11 of a crawler type on both of left and right sides (only the left one is illustrated in FIG. 1). Each of the left and right track devices 11 executes a travel action by a travel hydraulic motor 11*a* being a hydraulic actuator.

The upper swing structure 2 includes a swing frame 13 as a support structure mounted on the lower track structure 1 so as to swing, a cab 14 installed on a left front side of the swing frame 13, a counterweight 15 provided in a rear end portion of the swing frame 13, and a machine room 16 provided between the cab 14 and the counterweight 15. The operator's seat (not shown) on which the operator sits, an operation device 7 (refer to FIG. 3 described later) described later, and the like are disposed in the cab 14. The counterweight 15 serves to achieve a weight balance with the front work implement 3. The machine room 16 houses various devices such as hydraulic pumps 31 and 32, a prime mover 33, control valve units 40 and 80 (see FIG. 2 described later), and the like described later.

The front work implement 3 serves to execute various types of work such as excavation work and is an articulated type work implement formed by, for example, coupling a plurality of driven members so as to turn in the vertical direction. The plurality of driven members include, for example, a boom 18, an arm 19, and a bucket 20 as a work tool. A base end portion of the boom 18 is supported to a front portion of the swing frame 13 of the upper swing structure 2 so as to turn in the up-down direction. A base end portion of the arm 19 is supported to a distal end portion of the boom 18 so as to turn in the up-down direction. A base end portion of the bucket 20 is supported to a distal end portion of the arm 19 so as to turn in the up-down direction. The boom 18, the arm 19, and the bucket 20 act by drive of a boom cylinder 21, an arm cylinder 22, and a bucket cylinder 23 being hydraulic actuators, respectively.

Figure 2:
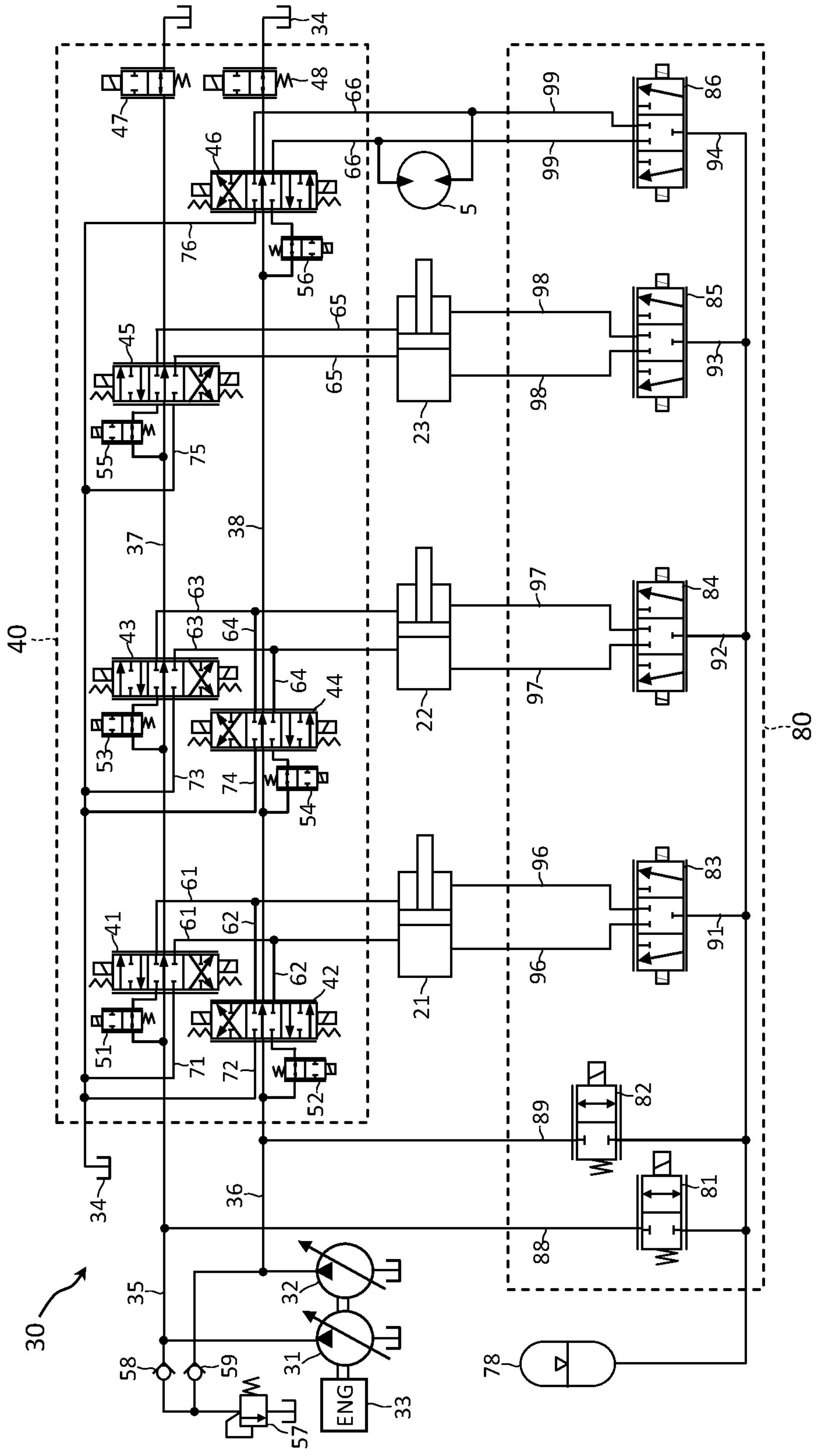
FIG. 2 is a hydraulic circuit diagram for illustrating a structure of a hydraulic system provided in the work machine according to the first embodiment.

A description is now given of a structure of a hydraulic system provided in the work machine according to the first embodiment with reference to FIG. 2. FIG. 2 is a hydraulic circuit diagram for illustrating the structure of the hydraulic system provided in the work machine according to the first embodiment.

In FIG. 2, the hydraulic excavator is provided with a hydraulic system 30 which causes the lower track structure 1, the upper swing structure 2, and the front work implement 3 (see FIG. 1 for all of them) to act by a hydraulic pressure. The hydraulic system 30 includes the first hydraulic pump 31 (hereinafter referred to as the first pump) and the second hydraulic pump 32 (hereinafter referred to as the second pump) which deliver pressurized fluid, the boom cylinder 21, the arm cylinder 22, the bucket cylinder 23, and the swing hydraulic motor 5 as the hydraulic actuators driven by the pressurized fluid supplied from the first pump 31 and the second pump 32, and a tank 34 which stores return fluid discharged from the hydraulic actuators 21, 22, 23, and 5. The prime mover 33 is mechanically coupled to the first pump 31 and the second pump 32, and the first pump 31 and the second pump 32 are driven by power of the prime mover 33. Each of the first pump 31 and the second pump 32 is, for example, a pump of the variable displacement type and includes a regulator which adjusts the pump displacement. The prime mover 33 is, for example, an engine or an electric motor.

The first pump 31 and the boom cylinder 21 are connected to each other via a boom first directional control valve 41, and the second pump 32 and the boom cylinder 21 are connected to each other via a boom second directional control valve 42. The first pump 31 and the arm cylinder 22 are connected to each other via an arm first directional control valve 43, and the second pump 32 and the arm cylinder 22 are connected to each other via an arm second directional control valve 44. The first pump 31 and the bucket cylinder 23 are connected to each other via a bucket directional control valve 45. The second pump 32 and the swing hydraulic motor 5 are connected to each other via a swing directional control valve 46.

The boom first directional control valve 41 controls a flow of the pressurized fluid supplied from the first pump 31 to the boom cylinder 21 and controls a flow of the return fluid discharged from the boom cylinder 21. The boom second directional control valve 42 controls a flow of the pressurized fluid supplied from the second pump 32 to the boom cylinder 21 and controls a flow of the return fluid of the boom cylinder 21. The arm first directional control valve 43 controls a flow of the pressurized fluid supplied from the first pump 31 to the arm cylinder 22 and controls a flow of the return fluid discharged from the arm cylinder 22. The arm second directional control valve 44 controls a flow of the pressurized fluid supplied from the second pump 32 to the arm cylinder 22 and controls a flow of the return fluid of the arm cylinder 22. The bucket directional control valve 45 controls a flow of the pressurized fluid supplied from the first pump 31 to the bucket cylinder 23 and controls a flow of the return fluid discharged from the bucket cylinder 23. The swing directional control valve 46 controls a flow of the pressurized fluid supplied from the second pump 32 to the swing hydraulic motor 5 and controls a flow of the return fluid discharged from the swing hydraulic motor 5.

In other words, the boom first directional control valve 41 controls connection between a meter-in side of the boom cylinder 21 and the first pump 31 and controls connection between a meter-out side of the boom cylinder 21 and the tank 34. The boom second directional control valve 42 controls connection between the meter-in side of the boom cylinder 21 and the second pump 32 and controls connection between the meter-out side of the boom cylinder 21 and the tank 34. The arm first directional control valve 43 controls connection between a meter-in side of the arm cylinder 22 and the first pump 31 and controls connection between a meter-out side of the arm cylinder 22 and the tank 34. The arm second directional control valve 44 controls connection between the meter-in side of the arm cylinder 22 and the second pump 32 and controls connection between the meter-out side of the arm cylinder 22 and the tank 34. The bucket directional control valve 45 controls connection between a meter-in side of the bucket cylinder 23 and the first pump 31 and controls connection between a meter-out side of the bucket cylinder 23 and the tank 34. The swing directional control valve 46 controls connection between a meter-in side of the swing hydraulic motor 5 and the second pump 32 and controls connection between a meter-out side of the swing hydraulic motor 5 and the tank 34.

Each of the directional control valves 41 to 46 is a control valve of the open-center type which discharges the pressurized fluid from the first pump 31 or the second pump 32 to the tank 34 when, for example, the pressurized fluid is not supplied to each of the hydraulic actuators 21, 22, 23, and 5. Specifically, each of the directional control valves 41 to 46 is, for example, a 6-port 3-position (6 ports including a pump port, a tank port, a pair of actuator ports, and a pair of center bypass ports) spool valve.

The boom first directional control valve 41, the arm first directional control valve 43, and the bucket directional control valve 45 are provided, for example, on a first center bypass line 37 connected to the first pump 31 via a first delivery line 35, from an upstream side in this order, and are connected in tandem. The first center bypass line 37 connects the first pump 31 and the tank 34 to each other. At the most downstream position on the first center bypass line 37, a first center bypass cut valve 47 (hereinafter referred to as the first CB cut valve) is provided. The first CB cut valve 47 controls a flow of the pressurized fluid flowing from the first pump 31 to the tank 34 via the first center bypass line 37.

The boom second directional control valve 42, the arm second directional control valve 44, and the swing directional control valve 46 are provided, for example, on a second center bypass line 38 connected to the second pump 32 via a second delivery line 36, from the upstream side in this order, and are connected in tandem. The second center bypass line 38 connects the second pump 32 and the tank 34 to each other. At the most downstream position on the second center bypass line 38, a second center bypass cut valve 48 (hereinafter referred to as the second CB cut valve) is provided. The second CB cut valve 48 controls a flow of the pressurized fluid flowing from the second pump 32 to the tank 34 via the second center bypass line 38.

A boom first flow control valve 51 is provided upstream of a meter-in side (pump port side) of the boom first directional control valve 41. The boom first flow control valve 51 controls a flow rate of the pressurized fluid supplied from the first pump 31 to the boom cylinder 21 via the boom first directional control valve 41. A boom second flow control valve 52 is provided upstream of a meter-in side (pump port side) of the boom second directional control valve 42. The boom second flow control valve 52 controls a flow rate of the pressurized fluid supplied from the second pump 32 to the boom cylinder 21 via the boom second directional control valve 42.

An arm first flow control valve 53 is provided upstream of a meter-in side (pump port side) of the arm first directional control valve 43. The arm first flow control valve 53 controls a flow rate of the pressurized fluid supplied from the first pump 31 to the arm cylinder 22 via the arm first directional control valve 43. An arm second flow control valve 54 is provided upstream of a meter-in side (pump port side) of the arm second directional control valve 44. The arm second flow control valve 54 controls a flow rate of the pressurized fluid supplied from the second pump 32 to the arm cylinder 22 via the arm second directional control valve 44.

A bucket flow control valve 55 is provided upstream of a meter-in side (pump port side) of the bucket directional control valve 45. The bucket flow control valve 55 controls a flow rate of the pressurized fluid supplied from the first pump 31 to the bucket cylinder 23 via the bucket directional control valve 45.

A swing flow control valve 56 is provided upstream of a meter-in side (pump port side) of the swing directional control valve 46. The swing flow control valve 56 controls a flow rate of the pressurized fluid supplied from the second pump 32 to the swing hydraulic motor 5 via the swing directional control valve 46.

The boom first directional control valve 41 is connected to a bottom side and a rod side of the boom cylinder 21 via boom first actuator lines 61, and the boom second directional control valve 42 is connected to the bottom side and the rod side of the boom cylinder 21 via boom second actuator lines 62. The arm first directional control valve 43 is connected to a bottom side and a rod side of the arm cylinder 22 via arm first actuator lines 63, and the arm second directional control valve 44 is connected to the bottom side and the rod side of the arm cylinder 22 via arm second actuator lines 64. The bucket directional control valve 45 is connected to a bottom side and a rod side of the bucket cylinder 23 via bucket first actuator lines 65. The swing directional control valve 46 is connected to a first port side and a second port side of the swing hydraulic motor 5 via swing first actuator lines 66.

A meter-out side (tank port side) of the boom first directional control valve 41 is connected to the tank 34 via a boom first return line 71, and a meter-out side (tank port side) of the boom second directional control valve 42 is connected to the tank 34 via a boom second return line 72. A meter-out side (tank port side) of the arm first directional control valve 43 is connected to the tank 34 via an arm first return line 73, and a meter-out side (tank port side) of the arm second directional control valve 44 is connected to the tank 34 via an arm second return line 74. A meter-out side (tank port side) of the bucket directional control valve 45 is connected to the tank 34 via a bucket return line 75. A meter-out side (tank port side) of the swing directional control valve 46 is connected to the tank 34 via a swing return line 76.

The directional control valves 41 to 46, the flow control valves 51 to 56, and the CB cut valves 47 and 48 described above form the first control valve unit 40 as an assembly of the plurality of control valves.

Moreover, the first pump 31 and the second pump 32 are connected to the tank 34 via a relief valve 57. The relief valve 57 opens when the pressure of the hydraulic circuit becomes a set value or higher, and hence, has a function of preventing a damage of the hydraulic device due to an excessive pressure increase. The relief valve 57 is connected to the first delivery line 35 via a first check valve 58 and is connected to the second delivery line 36 via a second check valve 59. The first check valve 58 and the second check valve 59 allow flows from the first pump 31 side and the second pump 32 side to the relief valve 57 side while interrupting flows from the relief valve 57 side to the first delivery line 35 and the second delivery line 36.

The hydraulic system 30 further includes an accumulator 78. The accumulator 78 accumulates the pressurized fluid supplied from the first pump 31 and the second pump 32 and supplies the accumulated pressurized fluid to the hydraulic actuators 21, 22, 23, and 5.

The accumulator 78 is connected to the first pump 31 via an accumulator first flow control valve 81 (hereinafter referred to as the ACC first flow control valve) and is connected to the second pump 32 via an accumulator second flow control valve 82 (hereinafter referred to as the ACC second flow control valve). The ACC first flow control valve 81 is connected to the first pump 31 via a first supply line 88, and the ACC second flow control valve 82 is connected to the second pump 32 via a second supply line 89.

The accumulator 78 is connected to the boom cylinder 21 via an accumulator first directional control valve 83 (hereinafter referred to as the ACC first directional control valve), to the arm cylinder 22 via an accumulator second directional control valve 84 (hereinafter referred to as the ACC second directional control valve), to the bucket cylinder 23 via an accumulator third directional control valve 85 (hereinafter referred to as the ACC third directional control valve), and to the swing hydraulic motor 5 via an accumulator fourth directional control valve 86 (hereinafter referred to as the ACC fourth directional control valve). The ACC first directional control valve 83 controls a flow (a direction and a flow rate) of the pressurized fluid supplied from the accumulator 78 to the boom cylinder 21. The ACC second directional control valve 84 controls a flow (a direction and a flow rate) of the pressurized fluid supplied from the accumulator 78 to the arm cylinder 22. The ACC third directional control valve 85 controls a flow (a direction and a flow rate) of the pressurized fluid supplied from the accumulator 78 to the bucket cylinder 23. The ACC fourth directional control valve 86 controls a flow (a direction and a flow rate) of the pressurized fluid supplied from the accumulator 78 to the swing hydraulic motor 5.

The ACC first directional control valve 83 is connected to the accumulator 78 via a boom accumulator line 91 and is connected to the bottom side and the rod side of the boom cylinder 21 via boom third actuator lines 96. The ACC second directional control valve 84 is connected to the accumulator 78 via an arm accumulator line 92 and is connected to the bottom side and the rod side of the arm cylinder 22 via arm third actuator lines 97. The ACC third directional control valve 85 is connected to the accumulator 78 via a bucket accumulator line 93 and is connected to the bottom side and the rod side of the bucket cylinder 23 via bucket second actuator lines 98. The ACC fourth directional control valve 86 is connected to the accumulator 78 via a swing accumulator line 94 and is connected to the first port side and the second port side of the swing hydraulic motor 5 via swing second actuator lines 99.

Each of the ACC directional control valves 83 to 86 is formed of, for example, a 3-port 3-position spool valve. The three ports are an accumulator port connected to the accumulator 78 and a pair of actuator ports connected to the bottom side and the rod side of each of the hydraulic cylinders 21, 22, and 23 or the first port side and the second port side of the hydraulic motor 5. That is, each of the ACC directional control valves 83 to 86 has a structure without a tank port. That is, the ACC directional control valves 83 to 86 control the connections between the meter-in sides of the hydraulic actuators 21, 22, 23, and 5 and the accumulator 78.

The ACC flow control valves 81 and 82 and the ACC directional control valves 83 to 86 described above form the second control valve unit 80 as an assembly of the plurality of control valves.

The hydraulic system 30 according to this embodiment is structured such that the ACC directional control valves 83 to 86 are devoid of meter-out circuits such as return lines for connection to the tank 34 and flow control valves which control flows of return fluid.

Figure 3:
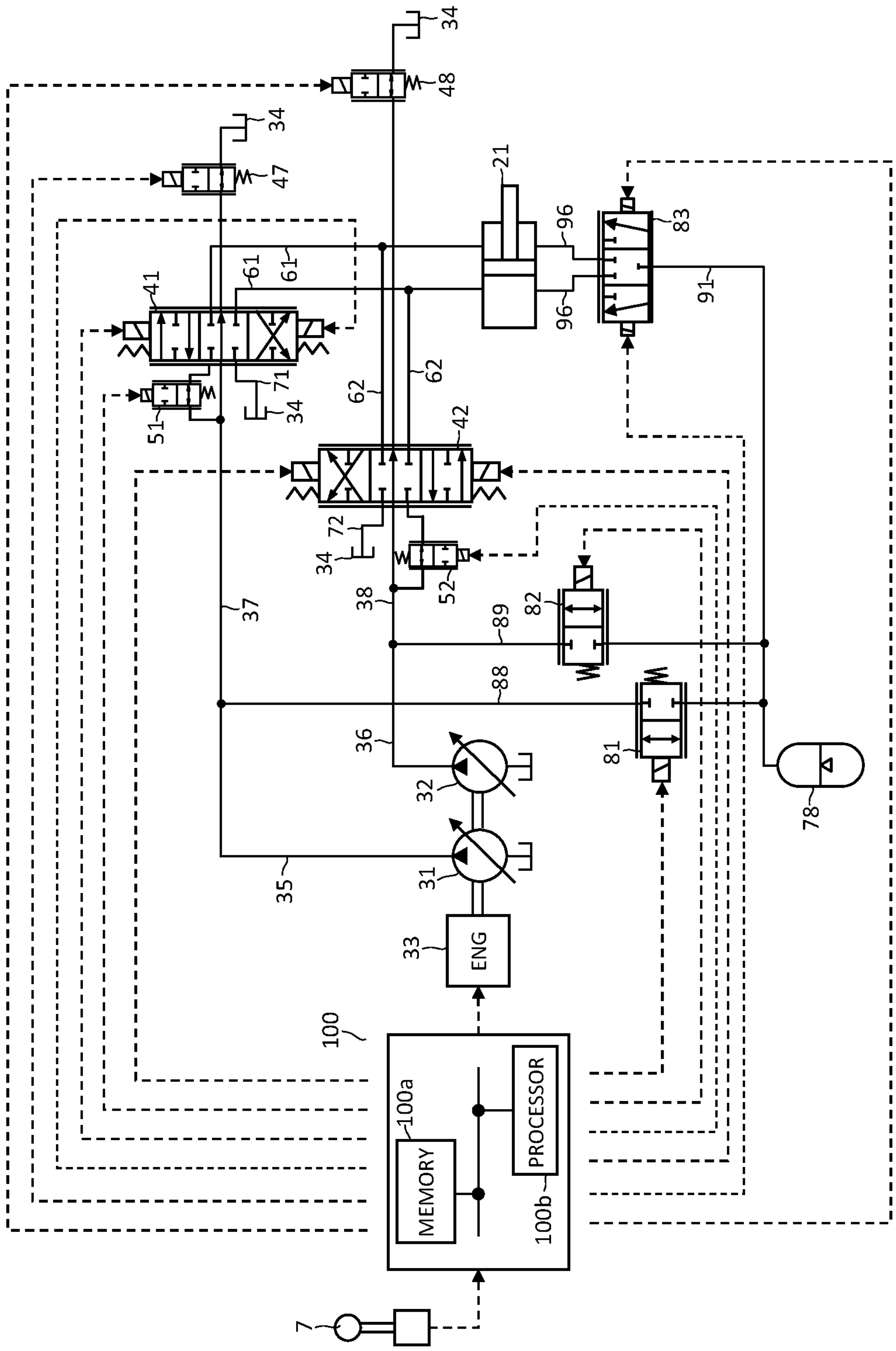
FIG. 3 is a diagram for illustrating, together with a controller, a part (circuit which drives a boom) of the hydraulic system of the work machine according to the first embodiment illustrated in FIG. 2.
Figure 4:
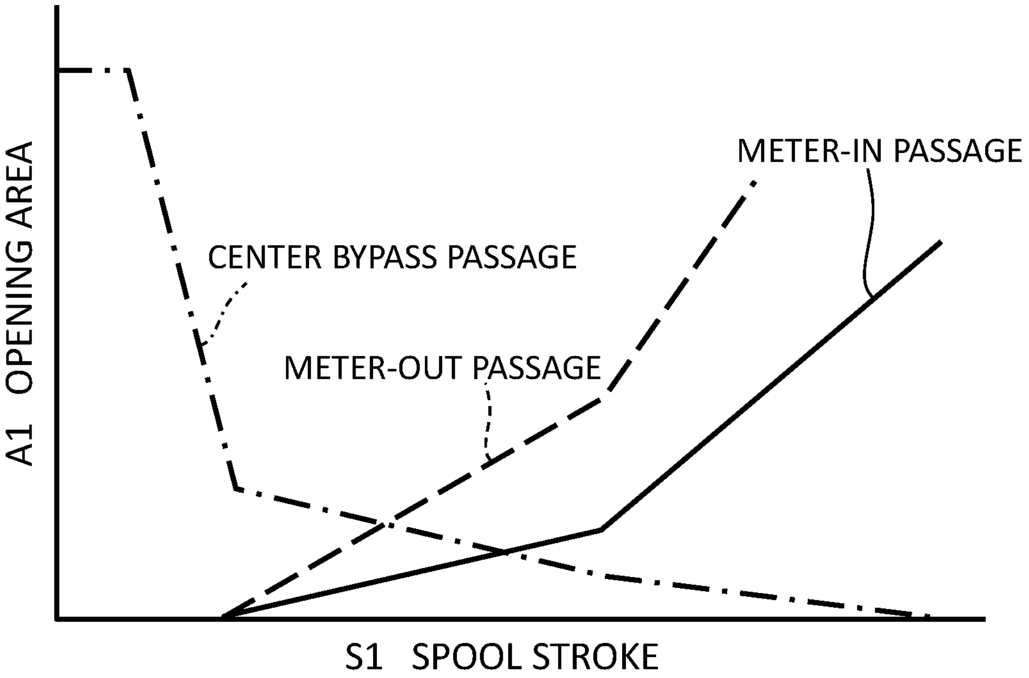
FIG. 4 is an opening area diagram of a pump directional control valve of the hydraulic system according to the first embodiment illustrated in FIG. 2.
Figure 5:
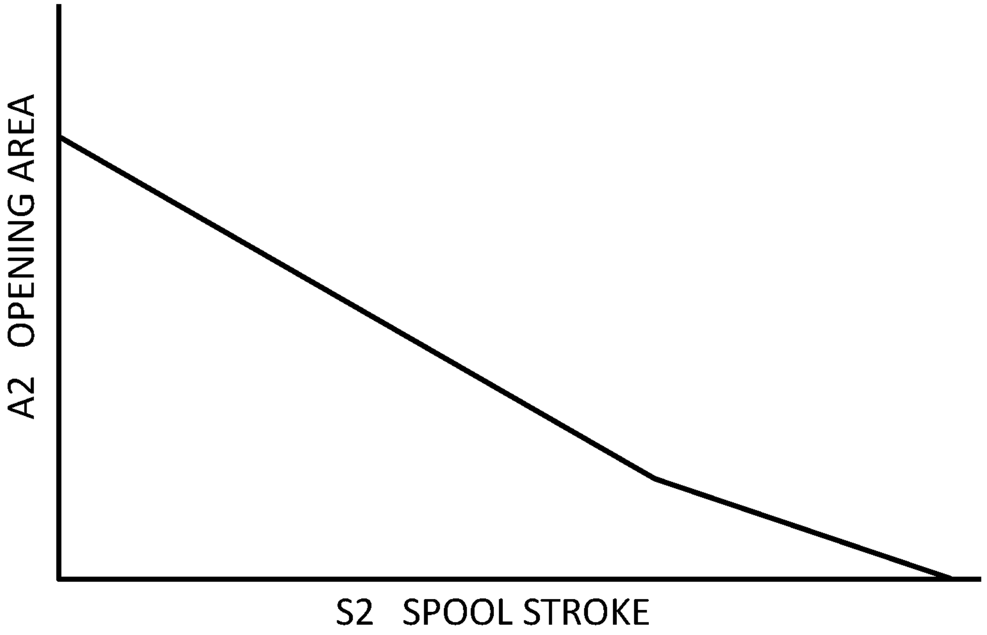
FIG. 5 is an opening area diagram of a pump flow control valve of the hydraulic system according to the first embodiment illustrated in FIG. 2.

A description is now given of control targets of a controller and characteristics of the control targets (control valves) in the hydraulic system for the work machine according to the first embodiment with reference to FIG. 3 to FIG. 5. FIG. 3 is a hydraulic circuit for the boom cylinder extracted from the hydraulic system illustrated in FIG. 2 and is a diagram of the control targets of the controller.

The hydraulic system 30 is structured to be controlled by a command of a controller 100. A description is given while using only a hydraulic circuit which is of the hydraulic system 30 and drives the boom cylinder 21, for the sake of a simple description of the control of the hydraulic system 30 by the controller 100. However, control of each of the hydraulic circuits for driving the arm cylinder 22, the bucket cylinder 23, and the swing hydraulic motor 5 in the hydraulic system 30 is also similar to that in the following description.

In FIG. 3, operation signals of the operation device 7 are input to the controller 100. The operation device 7 instructs the actions of the boom 18, the arm 19, and the bucket 20 of the front work implement 3 and the swing action of the upper swing structure 2. The operation device 7 outputs, to the controller 100, each of the operation signals (electric signals) for the boom operation, the arm operation, the bucket operation, and the swing operation according to an operation direction and an operation amount of an operation made by the operator.

The controller 100 controls, according to the operation signal for the boom operation from the operation device 7, the drive of each of the control valves being the boom first directional control valve 41, the boom second directional control valve 42, the boom first flow control valve 51, the boom second flow control valve 52, the first CB cut valve 47, the second CB cut valve 48, the ACC first flow control valve 81, the ACC second flow control valve 82, and the ACC first directional control valve 83 of the hydraulic system 30 described above. The same applies to a case in which the operation signal (electric signal) for each of the arm operation, the bucket operation, and the swing operation other than the boom operation is input.

Each of the boom first directional control valve 41 and the boom second directional control valve 42 is structured to, for example, switch a spool position (spool stroke) according to a command (for example, an electromagnetic command) from the controller 100. Each of the boom first directional control valve 41 and the boom second directional control valve 42 includes a meter-in passage, a meter-out passage, and a center bypass passage. The meter-in passage is a passage for connecting the first delivery line 35 (first pump 31) or the second delivery line 36 (second pump 32) to the meter-in side of the boom cylinder 21. The meter-out passage is a passage for connecting the meter-out side of the boom cylinder 21 to the tank 34. The center bypass passage is a passage which connects the first delivery line 35 (first pump 31) or the second delivery line 36 (second pump 32) to the first center bypass line 37 or the second center bypass line 38 (tank 34). In each of the boom first directional control valve 41 and the boom second directional control valve 42, a ratio among three opening areas being an opening area of the meter-in passage, an opening area of the meter-out passage, and an opening area of the center bypass passage changes by switching of a spool position.

The boom first directional control valve 41 and the boom second directional control valve 42 according to the present embodiment have, for example, an opening characteristic illustrated in FIG. 4. FIG. 4 is an opening area diagram of the boom first directional control valve and the boom second directional control valve. In FIG. 4, a horizontal axis S1 represents the spool stroke, and a vertical axis A1 represents the opening area of each of the passages being the meter-in passage, the meter-out passage, and the center bypass passage. A solid line represents a characteristic diagram of the meter-in passage, a broken line represents a characteristic diagram of the meter-out passage, and a one-dot chain line represents a characteristic diagram of the center bypass passage. The stroke in the present invention is the same in meaning as stroke amount.

The spool stroke (spool position) of each of the boom first directional control valve 41 and the boom second directional control valve 42 has such a characteristic as to increase in proportion to the operation amount of the operation device 7. The center bypass passage is structured such that the opening area is restricted as the spool stroke increases. Meanwhile, the meter-in passage and the meter-out passage are structured in advance such that the meter-in passage and the meter-out passage simultaneously start to open at a predetermined spool stroke (predetermined spool position) and the opening areas gradually increase as the spool stroke increases from the predetermined spool stroke. In the case of such an opening characteristic, when the spool stroke increases, the flow rate of the pressurized fluid flowing out from the first pump 31 or the second pump 32 to the tank 34 via the boom first directional control valve 41 or the boom second directional control valve 42 (center bypass passage) illustrated in FIG. 3 is restricted. Meanwhile, the pressurized fluid of the first pump 31 or the second pump 32 is supplied to the boom cylinder 21 via the boom first directional control valve 41 or the boom second directional control valve 42 (meter-in passage), and the return fluid discharged from the boom cylinder 21 is discharged from the boom first actuator lines 61 or the boom second actuator lines 62 and the boom first directional control valve 41 or the boom second directional control valve 42 (meter-out passage) to the tank 34 via the boom first return line 71 or the boom second return line 72.

Each of the boom first flow control valve 51 and the boom second flow control valve 52 is structured such that a stroke (spool position) is switched according to a command (for example, an electromagnetic command) from the controller 100. The boom first flow control valve 51 and the boom second flow control valve 52 have, for example, an opening characteristic illustrated in FIG. 5. FIG. 5 is an opening area diagram of the boom first flow control valve and the boom second flow control valve. In FIG. 5, a horizontal axis S2 represents the stroke, and a vertical axis A2 represents the opening area.

The opening areas of the boom first flow control valve 51 and the boom second flow control valve 52 have a normally-open characteristic. That is, the characteristic is such that the opening area is the maximum when the spool is not displaced and the opening area gradually decreases to close the opening as the stroke increases. Note that the strokes of the boom first flow control valve 51 and the boom second flow control valve 52 are controlled not in response to the operation amount of the operation device 7, but according to a situation, which is different from the case of the boom first directional control valve 41 and the boom second directional control valve 42.

Each of the first CB cut valve 47 and the second CB cut valve 48 is structured such that a stroke (spool position) is switched according to a command (for example, an electromagnetic command) from the controller 100, and is, for example, a control valve having a normally-open characteristic. Moreover, each of the ACC first flow control valve 81 and the ACC second flow control valve 82 is structured such that a stroke (spool position) is switched according to a command (for example, an electromagnetic command) from the controller 100, and is, for example, a control valve having a normally-closed characteristic. The ACC first directional control valve 83 is structured such that a spool stroke (spool position) is switched according to a command (for example, an electromagnetic command) from the controller 100, and is, for example, a control valve having such a characteristic that an opening area increases as the spool stroke increases.

Figure 6:
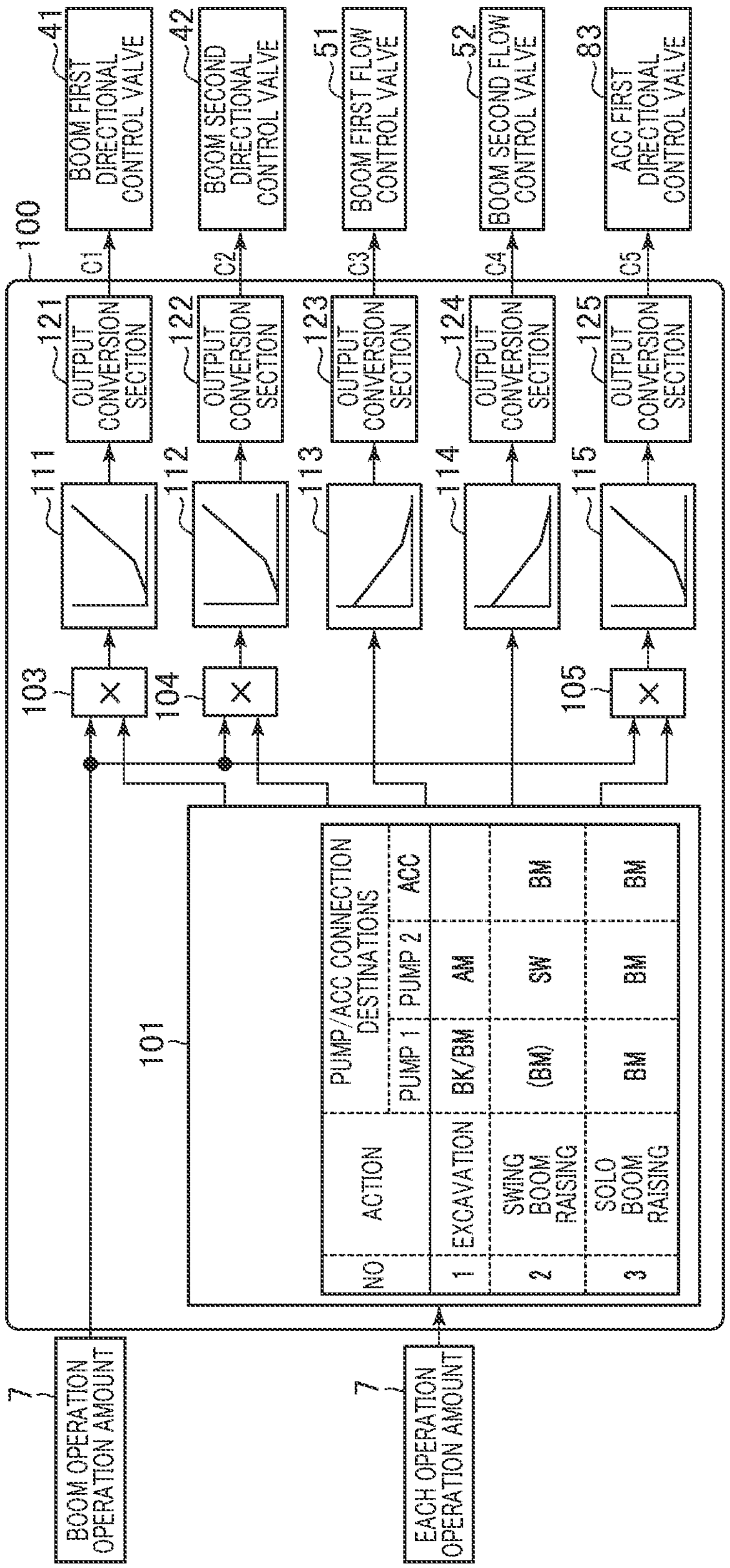
FIG. 6 is a block diagram for illustrating control logic in the controller of the work machine according to the first embodiment illustrated in FIG. 3.

A description is now given of control of the controller of the work machine according to the first embodiment with reference to FIG. 2 to FIG. 7. FIG. 6 is a block diagram for illustrating control logic in the controller of the work machine according to the first embodiment illustrated in FIG. 3. FIG. 7 is a table used by an action pattern computation section of the controller according to the first embodiment illustrated in FIG. 6.

In FIG. 3, the controller 100 includes, as a hardware structure, a memory 100*a* formed of a RAM, a ROM, or the like and a processor 100*b* formed of a CPU, an MPU, or the like. In the memory 100*a* are stored, in advance, programs and various types of information required to control the drive of each of the directional control valves 41 to 46, each of the flow control valves 51 to 56, and each of the CB cut valves 47 and 48 for the pumps 31 and 32 and the drive of each of the flow control valves 81 and 82 and each of the directional control valves 83 to 86 for the accumulator 78 in the hydraulic system 30. The processor 100*b* appropriately reads the programs and the various types of information from the memory 100*a* and executes processing according to these programs, to thereby implement various functions.

A description is now given of control of driving the boom cylinder 21 by the supply of the pressurized fluid from the first pump 31, the second pump 32, and the accumulator 78. Pieces of control of driving the arm cylinder 22, the bucket cylinder 23, and the swing hydraulic motor 5 by the supply of the pressurized fluid from the first pump 31, the second pump 32, and the accumulator 78 are similar to the case of the boom cylinder 21, and hence, a description of these pieces of control is omitted.

The controller 100 according to this embodiment roughly executes the following control. When the pressurized fluid of the first pump 31 is to be supplied to the boom cylinder 21, the controller 100 controls the drive of the boom first directional control valve 41, thereby controlling the flow of the pressurized fluid supplied from the first pump 31 to the boom cylinder 21 and controlling the return fluid discharged from the boom cylinder 21 so as to be discharged to the tank 34 via the boom first directional control valve 41. When the pressurized fluid of the second pump 32 is to be supplied to the boom cylinder 21, the controller 100 controls the drive of the boom second directional control valve 42, thereby controlling the flow of the pressurized fluid supplied from the second pump 32 to the boom cylinder 21 and controlling the return fluid of the boom cylinder 21 so as to be discharged to the tank 34 via the boom second directional control valve 42. Moreover, when the pressurized fluid accumulated in the accumulator 78 is to be supplied to the boom cylinder 21, the controller 100 controls the drive of the ACC first directional control valve 83, thereby controlling the flow of the pressurized fluid supplied from the accumulator 78 to the boom cylinder 21, controls the drive of the boom first directional control valve 41 to discharge the return fluid of the boom cylinder 21 into the tank 34 via the boom first directional control valve 41, and controls the drive of the boom first flow control valve 51, thereby eventually interrupting the pressurized fluid supplied from the first pump 31 to the boom cylinder 21 via the boom first directional control valve 41.

The controller 100 executes, in order to implement the control described above, for example, control logic illustrated in FIG. 6 for input of an operation amount (operation signal) of each operation (the boom operation, the arm operation, the bucket operation, or the swing operation) of the operation device 7, thereby outputting a boom first spool control command C1 for commanding the drive of the boom first directional control valve 41, a boom second spool control command C2 for commanding the drive of the boom second directional control valve 42, a boom first flow control command C3 for commanding the drive of the boom first flow control valve 51, a boom second flow control command C4 for commanding the drive of the boom second flow control valve 52, and a boom ACC flow control command C5 for commanding the drive of the ACC first directional control valve 83.

Specifically, in FIG. 6, the control logic of the controller 100 includes an action pattern computation section 101 which identifies an action pattern of the hydraulic excavator on the basis of the operation amount (operation signal) of each operation from the operation device 7, multiplication sections 103, 104, and 105 corresponding to the boom first directional control valve 41, the boom second directional control valve 42, and the ACC first directional control valve 83 out of the plurality of control valves 41, 42, 51, 52, and 83 being the control targets, and function generation sections 111, 112, 113, 114, and 115 and output conversion sections 121, 122, 123, 124, and 125 corresponding to the control valves 41, 42, 51, 52, and 83 being the control targets, respectively.

The action pattern computation section 101 identifies the action pattern to be executed by the hydraulic excavator on the basis of the operation amount (operation signal) of each operation from the operation device 7 and sets the drive state of each of the control valves 41, 42, 51, 52, and 83 being the control targets such that the hydraulic system 30 is optimally operated in each identified action pattern. That is, the action pattern computation section 101, according to each action pattern, determines which of the hydraulic fluid sources being the first pump 31, the second pump 32, and the accumulator 78 is connected to which of the hydraulic actuators 21, 22, 23, and 5, and sets the drive state of each of the control valves 41, 42, 51, 52, and 83 being the control targets such that the pressurized fluid can be supplied to the connection destination of each of the determined hydraulic fluid sources 31, 32, and 78. Specifically, the action pattern computation section 101 refers to, for example, information (table) illustrated in FIG. 7 to set the drive state of each of the control valves 41, 42, 51, 52, and 83 being the control targets.

In the table illustrated in FIG. 7, as the action patterns, an excavation action, a swing boom raising action, and a solo boom raising action being representative actions of the hydraulic excavator are listed. The excavation action is a triple combined action formed by combining the actions of the three link members being the boom 18, the arm 19, and the bucket 20 forming the front work implement 3. That is, the excavation action is an action of simultaneously driving the boom cylinder 21, the arm cylinder 22, and the bucket cylinder 23. The swing boom raising action is a double combined action obtained by combining the swing action of the upper swing structure 2 and the action of the boom 18. That is, the swing boom raising action is an action of simultaneously driving the swing hydraulic motor 5 and the boom cylinder 21. The solo boom raising action is a solo action in which only the boom 18 acts by driving only the boom cylinder 21 in its extension direction.

The table illustrated in FIG. 7 indicates the connection destination (the supply destination of the pressurized fluid) of each of the hydraulic fluid sources 31, 32, and 78 for optimally operating the hydraulic system 30 in each action pattern. In FIG. 7, pump 1 denotes the first pump 31, pump 2 denotes the second pump 32, and ACC denotes the accumulator 78. BM denotes the boom cylinder 21, AM denotes the arm cylinder 22, BK denotes the bucket cylinder 23, and SW denotes the swing hydraulic motor 5.

When the identification result of the action pattern is the excavation action, the first pump 31 is connected to the boom cylinder 21 and the bucket cylinder 23. This means that the boom first directional control valve 41 and the bucket directional control valve 45 illustrated in FIG. 2 are driven. Moreover, the second pump 32 is connected to the arm cylinder 22. This means that the arm second directional control valve 44 illustrated in FIG. 2 is driven. Note that the accumulator 78 is connected to none of the hydraulic actuators 21, 22, 23, and 5.

In the case of the swing boom raising action, the second pump 32 is connected to the swing hydraulic motor 5. This means that the swing directional control valve 46 illustrated in FIG. 2 is driven. Moreover, the accumulator 78 is connected to the boom cylinder 21. This means that the ACC first directional control valve 83 illustrated in FIG. 2 is driven. Note that, when the pressurized fluid is supplied from the accumulator 78 to the boom cylinder 21 via the ACC first directional control valve 83, the return fluid discharged from the boom cylinder 21 cannot be discharged to the tank 34 via the ACC first directional control valve 83 due to the structure of the hydraulic system 30.

Thus, in the present embodiment, the boom first directional control valve 41 independent of the pressurized fluid supply of the second pump 32 is driven to connect the meter-out side of the boom cylinder 21 to the tank 34 via the boom first directional control valve 41. Note that, when the boom first directional control valve 41 is driven, as illustrated in FIG. 4, the meter-in passage opens at the same time as the meter-out passage opens, and hence, there occurs such a state that the meter-in side of the boom cylinder 21 is connected to the first pump 31 via the boom first directional control valve 41. This means that there is brought about such a state that the pressurized fluid of the first pump 31 is unintentionally supplied to the boom cylinder 21. Thus, in the present embodiment, the boom first flow control valve 51 illustrated in FIG. 2 is driven to interrupt the supply of the pressurized fluid from the first pump 31 to the boom cylinder 21 via the boom first directional control valve 41. As a result, the pressurized fluid is supplied to the boom cylinder 21 from only the accumulator 78. That is, in the table illustrated in FIG. 7, the description of "(BM)" as the connection destination of the pump 1 in the swing boom raising action indicates that the meter-out side of the boom cylinder 21 is connected to the tank 34 by driving the boom first directional control valve 41 for connecting the first pump 31 to the boom cylinder 21, and that the supply of the pressurized fluid from the first pump 31 to the boom cylinder 21 via the boom first directional control valve 41 is interrupted by driving the boom first flow control valve 51.

Moreover, in the case of the solo boom raising action, the three hydraulic fluid sources being the first pump 31, the second pump 32, and the accumulator 78 are simultaneously connected to the boom cylinder 21. This means that the boom first directional control valve 41, the boom second directional control valve 42, and the ACC first directional control valve 83 are simultaneously driven.

The action pattern computation section 101 sets the drive state of each of the control valves 41, 42, 51, 52, and 83 being the control targets described above according to the identification result of the action pattern. The set result of the drive state for each of the control valves 41, 42, 51, 52, and 83 is output to each of the multiplication sections 103, 104, and 105 or each of the function generation sections 113 and 114.

Specifically, the action pattern computation section 101 outputs, to the multiplication section 103, a setting result being "1" in the case of driving or being "0" in the case of not driving, as the drive state of the boom first directional control valve 41. Further, the action pattern computation section 101 outputs, to the multiplication section 104, a setting result being "1" in the case of driving or being "0" in the case of not driving, as the drive state of the boom second directional control valve 42. Moreover, the action pattern computation section 101 outputs, to the multiplication section 105, a setting result being "1" in the case of driving or being "0" in the case of not driving, as the drive state of the ACC first directional control valve 83. By such an output of the action pattern computation section 101, the control of whether or not to drive each of the boom first directional control valve 41, the boom second directional control valve 42, and the ACC first directional control valve 83 is enabled.

In addition, the action pattern computation section 101 outputs a setting result of increasing the opening area to the function generation section 113 when the first pump 31 is to be connected to the meter-in side of the boom cylinder 21 via the boom first directional control valve 41 (in the case of the excavation action or the solo boom raising action), as the drive state of the boom first flow control valve 51. Moreover, the action pattern computation section 101 outputs a setting result of closing the opening to the function generation section 113 when the meter-out side of the boom cylinder 21 is to be connected to the tank 34 via the boom first directional control valve 41 (in the case of the swing boom raising action), as the drive state of the boom first flow control valve 51.

Further, the action pattern computation section 101 outputs a setting result of increasing the opening area to the function generation section 114 when the second pump 32 is to be connected to the meter-in side of the boom cylinder 21 via the boom second directional control valve 42 (in the case of the solo boom raising action), as the drive state of the boom second flow control valve 52. Moreover, the action pattern computation section 101 outputs a setting result of closing the opening to the function generation section 114 when the meter-out side of the boom cylinder 21 is to be connected to the tank 34 via the boom second directional control valve 42, as the drive state of the boom second flow control valve 52.

The multiplication section 103 for the boom first directional control valve 41 multiplies the operation amount (operation signal) of the boom operation of the operation device 7 and the setting result of the drive state for the boom first directional control valve 41 of the action pattern computation section 101 by each other. A multiplication result is output to the function generation section 111 for the boom first directional control valve 41. The operation signal of the boom operation of the operation device 7 is a signal according to the operation amount of the boom operation and is a value, for example, from 0 to 100 [%]. The setting result of the drive state for the boom first directional control valve 41 of the action pattern computation section 101 is "0" in the case of not driving or "1" in the case of driving as described before. That is, the multiplication section 103 outputs, to the function generation section 111, the same value as the operation signal of the boom operation of the operation device 7 when the boom first directional control valve 41 is driven and the value (signal) of “0” when the boom first directional control valve 41 is not driven.

The function generation section 111 calculates the opening area of the boom first directional control valve 41 according to the output (multiplication result) of the multiplication section 103. A calculation result is output to the output conversion section 121 for the boom first directional control valve 41.

The output conversion section 121 is a computation section which converts the opening area of the boom first directional control valve 41 being the output (calculation result) of the function generation section 111 into the displacement amount (stroke) of the spool. A computation result is output, as the boom first spool control command C1, to the boom first directional control valve 41. As a result, the boom first directional control valve 41 is controlled to achieve the desired stroke and opening area.

The multiplication section 104, the function generation section 112, and the output conversion section 122 for the boom second directional control valve 42 are also similar to the case of the boom first directional control valve 41 described above. That is, the multiplication section 104 multiplies the operation signal (0 to 100) of the boom operation of the operation device 7 and the setting result (“0” in the case of not driving or “1” in the case of driving) of the drive state for the boom second directional control valve 42 of the action pattern computation section 101 by each other and outputs the multiplication result to the function generation section 112. The function generation section 112 calculates the opening area of the boom second directional control valve 42 according to the output of the multiplication section 104 and outputs the calculation result to the output conversion section 122. The output conversion section 122 converts the opening area of the boom second directional control valve 42 being the output of the function generation section 112 into the displacement amount of the spool and outputs the computation result, as the boom second spool control command C2, to the boom second directional control valve 42. As a result, the boom second directional control valve 42 is controlled to achieve the desired stroke and opening area.

The multiplication section 105, the function generation section 115, and the output conversion section 125 for the ACC first directional control valve 83 are also similar to the case of the boom first directional control valve 41 described above. That is, the multiplication section 105 multiplies the operation signal (0 to 100) of the boom operation of the operation device 7 and the setting result (“0” in the case of not driving or “1” in the case of driving) of the drive state for the ACC first directional control valve 83 of the action pattern computation section 101 by each other and outputs the multiplication result to the function generation section 115. The function generation section 115 calculates the opening area of the ACC first directional control valve 83 according to the output of the multiplication section 105 and outputs the calculation result to the output conversion section 125. The output conversion section 125 converts the opening area of the ACC first directional control valve 83 being the output of the function generation section 115 into the displacement amount of the spool of the ACC first directional control valve 83 and outputs the computation result, as the boom ACC flow control command C5, to the ACC first directional control valve 83. As a result, the ACC first directional control valve 83 is controlled to achieve the desired stroke and opening area.

The function generation section 113 for boom first flow control valve 51 executes computation for controlling the opening area of the boom first flow control valve 51 according to the setting result (signal) for the drive state of the boom first flow control valve 51 from the action pattern computation section 101. A computation result is output to the output conversion section 123 for the boom first flow control valve 51.

The function generation section 113 outputs a computation result for increasing the opening area (reducing the stroke) according to the output of the action pattern computation section 101 when the first pump 31 is to be connected to the boom cylinder 21 (in the case of the excavation action and the solo boom raising action in FIG. 7). Meanwhile, when the boom cylinder 21 is not to be driven or when the meter-in side of the boom cylinder 21 is to be connected to only the accumulator 78 (in the case of the swing boom raising action in FIG. 7), the function generation section 113 outputs a computation result for closing the opening (increasing the stroke) according to the output of the action pattern computation section 101.

The output conversion section 123 computes the boom first flow control command C3 on the basis of the output of the function generation section 113 and outputs the boom first flow control command C3 to the boom first flow control valve 51. As a result, the boom first flow control valve 51 is controlled to achieve the desired stroke and opening area. Note that, when only accumulator 78 is to be connected to the meter-in side of the boom cylinder 21 (in the case of the swing boom raising action of FIG. 7), the control of closing the opening is applied to the boom first flow control valve 51, but shock occurs if the stroke is quickly changed. Thus, the boom first flow control valve 51 is not controlled to switch, such as to be switched ON or OFF, but is controlled to gradually change the stroke to eventually close. That is, the drive of the boom first flow control valve 51 is controlled such that the flow of the pressurized fluid from the first pump 31 to the boom cylinder 21 via the boom first directional control valve 41 is gradually restricted and is eventually interrupted.

The function generation section 114 and the output conversion section 124 for the boom second flow control valve 52 are also similar to the case of the boom first flow control valve 51 described above. The function generation section 114 executes computation for controlling the opening area of the boom second flow control valve 52 according to the setting result (signal) for the drive state of the boom second flow control valve 52 from the action pattern computation section 101 and outputs a computation result to the output conversion section 124. The output conversion section 124 computes the boom second flow control command C4 on the basis of the output of the function generation section 114 and outputs the boom second flow control command C4 to the boom second flow control valve 52. As a result, the boom second flow control valve 52 is controlled to achieve the desired stroke and opening area.

A description is now given of the action of the work machine according to the first embodiment with reference to FIG. 2 and FIG. 6.

When the controller 100 illustrated in FIG. 6 identifies the action as the “excavation action” on the basis of the operation signal of each operation of the operation device 7, the controller 100 executes control of driving the boom first directional control valve 41 and the bucket directional control valve 45 in order to connect the first pump 31 illustrated in FIG. 2 to the boom cylinder 21 and the bucket cylinder 23 and executes control of driving the arm second directional control valve 44 in order to connect the second pump 32 to the arm cylinder 22.

As a result, the pressurized fluid of the first pump 31 is supplied to the boom cylinder 21 via the boom first flow control valve 51 and the boom first directional control valve 41. At this time, the return fluid discharged from the boom cylinder 21 is introduced from the boom first directional control valve 41 to the tank 34 via the boom first return line 71. Similarly, the pressurized fluid of the first pump 31 is supplied to the bucket cylinder 23 via the bucket flow control valve 55 and the bucket directional control valve 45. At this time, the return fluid discharged from the bucket cylinder 23 is introduced from the bucket directional control valve 45 to the tank 34 via the bucket return line 75. Moreover, the pressurized fluid of the second pump 32 is supplied to the arm cylinder 22 via the arm second flow control valve 54 and the arm second directional control valve 44. At this time, the return fluid discharged from the arm cylinder 22 is introduced from the arm second directional control valve 44 to the tank 34 via the arm second return line 74.

Moreover, when the controller 100 identifies the action as the "swing boom raising action," the controller 100 executes control of driving the swing directional control valve 46 in order to connect the second pump 32 to the swing hydraulic motor 5 and executes control of driving the ACC first directional control valve 83 in order to connect the accumulator 78 to the boom cylinder 21. In this case, the controller 100 further executes control of driving the boom first directional control valve 41 such that the meter-out side of the boom cylinder 21 and the tank 34 are connected to each other, and control of gradually restricting the opening of the boom first flow control valve 51 and eventually closing the opening.

As a result, the pressurized fluid of the second pump 32 is supplied to the swing hydraulic motor 5 via the swing flow control valve 56 and the swing directional control valve 46. At this time, the return fluid discharged from the swing hydraulic motor 5 is introduced by the swing return line 76 to the tank 34 via the swing directional control valve 46. Moreover, the pressurized fluid of the accumulator 78 is supplied to the boom cylinder 21 via the ACC first directional control valve 83. At this time, the return fluid of the boom cylinder 21 is introduced by the boom first return line 71 from the boom first actuator line 61 to the tank 34 via the boom first directional control valve 41. At this time, the flow of the pressurized fluid from the first pump 31 to the boom cylinder 21 via the boom first directional control valve 41 by the drive of the boom first directional control valve 41 is gradually restricted and is eventually interrupted by the drive of the boom first flow control valve 51.

Note that, when the pressure of the hydraulic circuit of the first pump 31 exceeds a set value by the drive of the boom first directional control valve 41 and the boom first flow control valve 51, damage of the hydraulic devices are prevented by the relief valve 57 opening.

Moreover, when the controller 100 identifies the action as the "solo boom raising action," the controller 100 executes control of driving the boom first directional control valve 41, the boom second directional control valve 42, and the ACC first directional control valve 83 in order to connect the three hydraulic fluid sources being the first pump 31, the second pump 32, and the accumulator 78 to the boom cylinder 21.

As a result, the pressurized fluid of the first pump 31 is supplied to the boom cylinder 21 via the boom first flow control valve 51 and the boom first directional control valve 41. Similarly, the pressurized fluid of the second pump 32 is supplied to the boom cylinder 21 via the boom second flow control valve 52 and the boom second directional control valve 42. Moreover, the pressurized fluid of the accumulator 78 is supplied to the boom cylinder 21 via the ACC first directional control valve 83. At this time, the return fluid of the boom cylinder 21 is introduced from the boom first directional control valve 41 to the tank 34 via the boom first return line 71 and is introduced from the boom second directional control valve 42 to the tank 34 via the boom second return line 72.

As described above, when the pressurized fluid is supplied from only the hydraulic fluid source being the accumulator 78 to each of the hydraulic actuators 21, 22, 23, and 5, the controller 100 according to the present embodiment executes control of driving the ACC directional control valves 83, 84, 85, and 86 corresponding to the respective hydraulic actuators 21, 22, 23, and 5 and driving the directional control valves 41 to 46 and the flow control valves 51 to 56 corresponding to the respective hydraulic actuators 21, 22, 23, and 5. As a result, each of the hydraulic actuators 21, 22, 23, and 5 can be driven by only the pressurized fluid from the accumulator 78 while the meter-out side of each of the hydraulic actuators 21, 22, 23, and 5 is connected to the tank 34 in the state in which the supply of the pressurized fluid to each of the hydraulic actuators 21, 22, 23, and 5 from the first pump 31 or the second pump 32 via each of the directional control valves 41 to 46 is interrupted. With this control, it is possible to achieve the hydraulic circuit which does not require a circuit for meter-out such as a return line and a flow control valve on the return line for each of the ACC directional control valves 83, 84, 85, and 86 which controls the flow of the pressurized fluid from the accumulator 78 to each of the hydraulic actuators 21, 22, 23, and 5.

Moreover, the pressurized fluid can be supplied from the efficient hydraulic fluid source of the three hydraulic fluid sources being the first pump 31, the second pump 32, and the accumulator 78 to each of the hydraulic actuators 21, 22, 23, and 5 by the processing of the action pattern computation section 101 of the controller 100. Further, the pressurized fluid can also simultaneously be supplied from the three hydraulic fluid sources being the first pump 31, the second pump 32, and the accumulator 78 to each of the hydraulic actuators 21, 22, 23, and 5.

Note that, in the hydraulic system 30 according to the present embodiment, when the pressurized fluid is supplied from the first pump 31 and the second pump 32 to the accumulator 78, control of driving the first CB cut valve 47 and the second CB cut valve 48 such that the openings are restricted or closed is executed.

The hydraulic excavator (work machine) according to the first embodiment described above includes the first pump 31 and the second pump 32 (hydraulic pump) that deliver the pressurized fluid, the hydraulic actuators 21, 22, 23, and 5 that are driven by the pressurized fluid delivered from the first pump 31 and the second pump 32 (hydraulic pump), the tank 34 that stores the return fluid discharged from the hydraulic actuators 21, 22, 23, and 5, the accumulator 78 that accumulates the pressurized fluid delivered from the first pump 31 and the second pump 32 (hydraulic pump) and supplies the accumulated pressurized fluid to the hydraulic actuators 21, 22, 23, and 5, the directional control valves 41 to 46 (first control valve) that control the connection between the meter-in sides of the hydraulic actuators 21, 22, 23, and 5 and the first pump 31 or the second pump 32 (hydraulic pump) and controls the connection between the meter-out sides of the hydraulic actuators 21, 22, 23, and 5 and the tank 34, and the directional control valves 83 to 86 (second control valve) that control the connection between the meter-in sides of the hydraulic actuators 21, 22, 23, and 5 and the accumulator 78. The hydraulic excavator (work machine) further includes the flow control valves 51 to 56 as a flow control mechanism that controls the flow rates of the pressurized fluid from the first pump 31 or the second pump 32 (hydraulic pump) to the hydraulic actuators 21, 22, 23, and 5 via the directional control valves 41 to 46 (first control valve), and the controller 100 that controls the directional control valves 41 to 46 (first control valve), the directional control valves 83 to 86 (second control valve), and the flow control valves 51 to 56 (flow control mechanism). The controller 100 is configured to, when the pressurized fluid is supplied from only the accumulator 78 to the hydraulic actuators 21, 22, 23, and 5, drive the directional control valves 83 to 86 (second control valve) such that the meter-in sides of the hydraulic actuators 21, 22, 23, and 5 and the accumulator 78 are connected to each other, drive the directional control valves 41 to 46 (first control valve) such that the meter-out sides of the hydraulic actuators 21, 22, 23, and 5 and the tank 34 are connected to each other, and drive the flow control valves 51 to 56 (flow control mechanism) such that the flows of the pressurized fluid from the first pump 31 or the second pump 32 (hydraulic pump) to the hydraulic actuators 21, 22, 23, and 5 via the directional control valves 41 to 46 (first control valve) are eventually interrupted.

With this configuration, when the pressurized fluid is supplied from only the accumulator 78 to the hydraulic actuators 21, 22, 23, and 5, the meter-out sides of the hydraulic actuators 21, 22, 23, and 5 and the tank 34 are connected to each other by the drive of the directional control valves 41 to 46 (first control valve), the flows of the pressurized fluid from the first pump 31 or the second pump 32 (hydraulic pump) to the hydraulic actuators 21, 22, 23, and 5 via the directional control valves 41 to 46 (first control valve) are interrupted by the drive of the flow control valves 51 to 56 (flow control mechanism), and hence, the return fluid of the hydraulic actuators 21, 22, 23, and 5 can be discharged to the tank 34 via the directional control valves 41 to 46 (first control valve) even when the pressurized fluid is supplied from the accumulator 78 to the hydraulic actuators 21, 22, 23, and 5. That is, the control of the flows of the meter-out sides of the hydraulic actuators 21, 22, 23, and 5 can be achieved by only the directional control valves 41 to 46 (first control valve). Accordingly, it is not required to provide a circuit for the meter-out such as a return hydraulic line and a flow control valve to the directional control valves 83 to 86 (second control valve), and hence, it is possible to suppress the increase in complexity of the structure in the hydraulic system 30 capable of supplying the pressurized fluid from the accumulator 78, in addition to the first pump 31 and the second pump 32 (hydraulic pump), to the hydraulic actuators 21, 22, 23, and 5.

Moreover, in the present embodiment, the directional control valves 41 to 46 (first control valve) have the opening characteristic that both the meter-in passage for connecting the first pump 31 or the second pump 32 (hydraulic pump) to the hydraulic actuators 21, 22, 23, and 5 and the meter-out passage for connecting the tank 34 to the hydraulic actuators 21, 22, 23, and 5 simultaneously start to open and to communicate with each other at a predetermined stroke set in advance and both of the passages form the open states at a stroke longer than the predetermined stroke. Moreover, the flow control mechanism is formed of the other flow control valves 51 to 56 different from the directional control valves 41 to 46 (first control valve).

With this structure, the controller 100 individually controls the directional control valves 41 to 46 (first control valve) and the flow control valves 51 to 56 to secure the connection between the meter-out sides of the hydraulic actuators 21, 22, 23, and 5 and the tank 34 and to interrupt the connection between the first pump 31 or the second pump 32 (hydraulic pump) and the hydraulic actuators 21, 22, 23, and 5, and hence, the control of the directional control valves 41 to 46 (first control valve) and the flow control valves 51 to 56 is easy.

Second Embodiment

Figure 8:
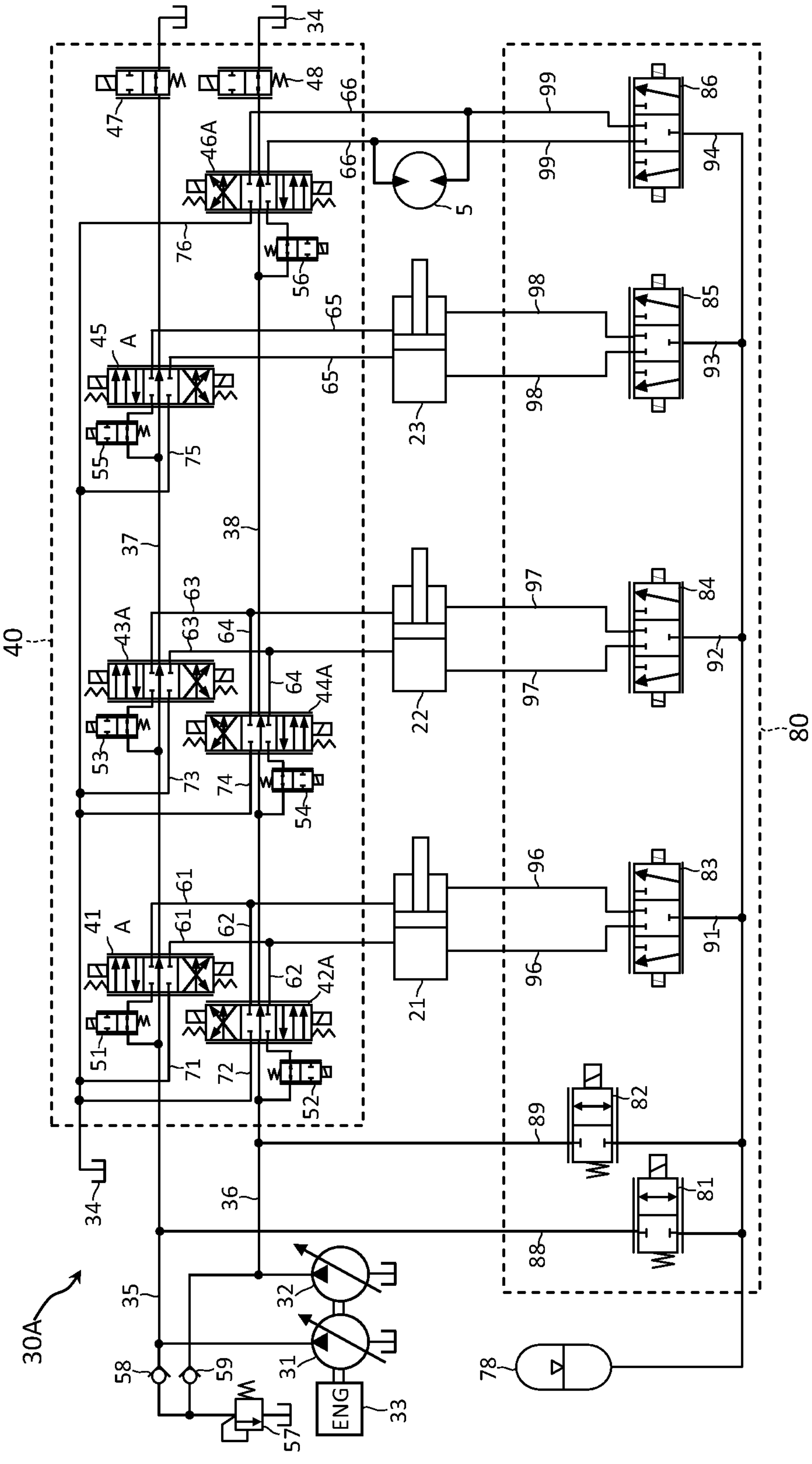
FIG. 8 is a hydraulic circuit diagram for illustrating a structure of a hydraulic system provided in the work machine according to a second embodiment of the present invention.
Figure 9:
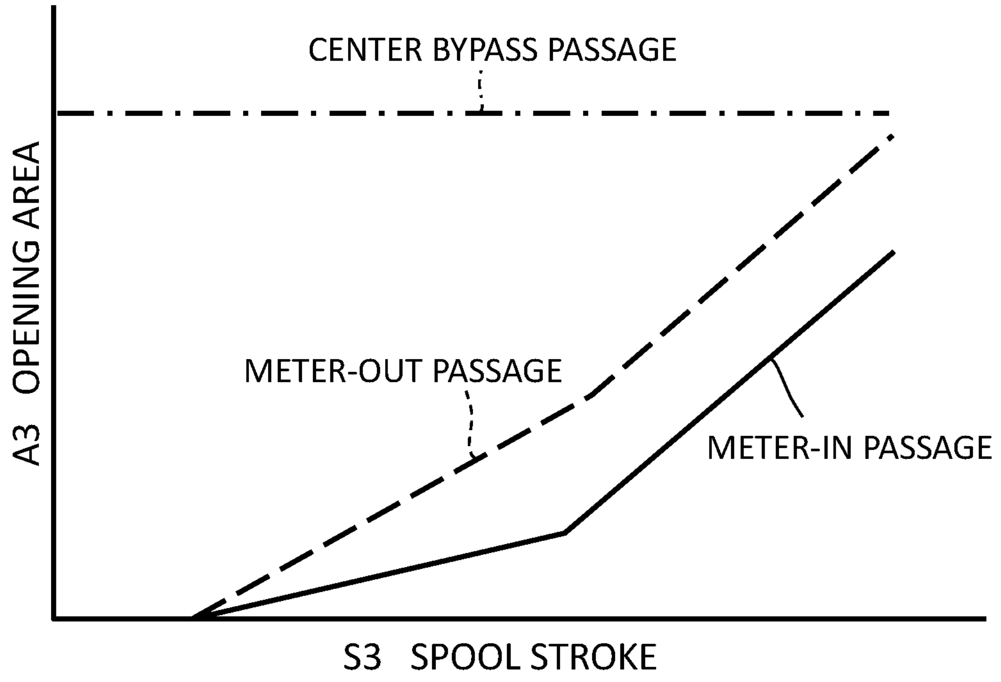
FIG. 9 is an opening area diagram of a pump directional control valve of the hydraulic system according to the second embodiment illustrated in FIG. 8.
Figure 10:
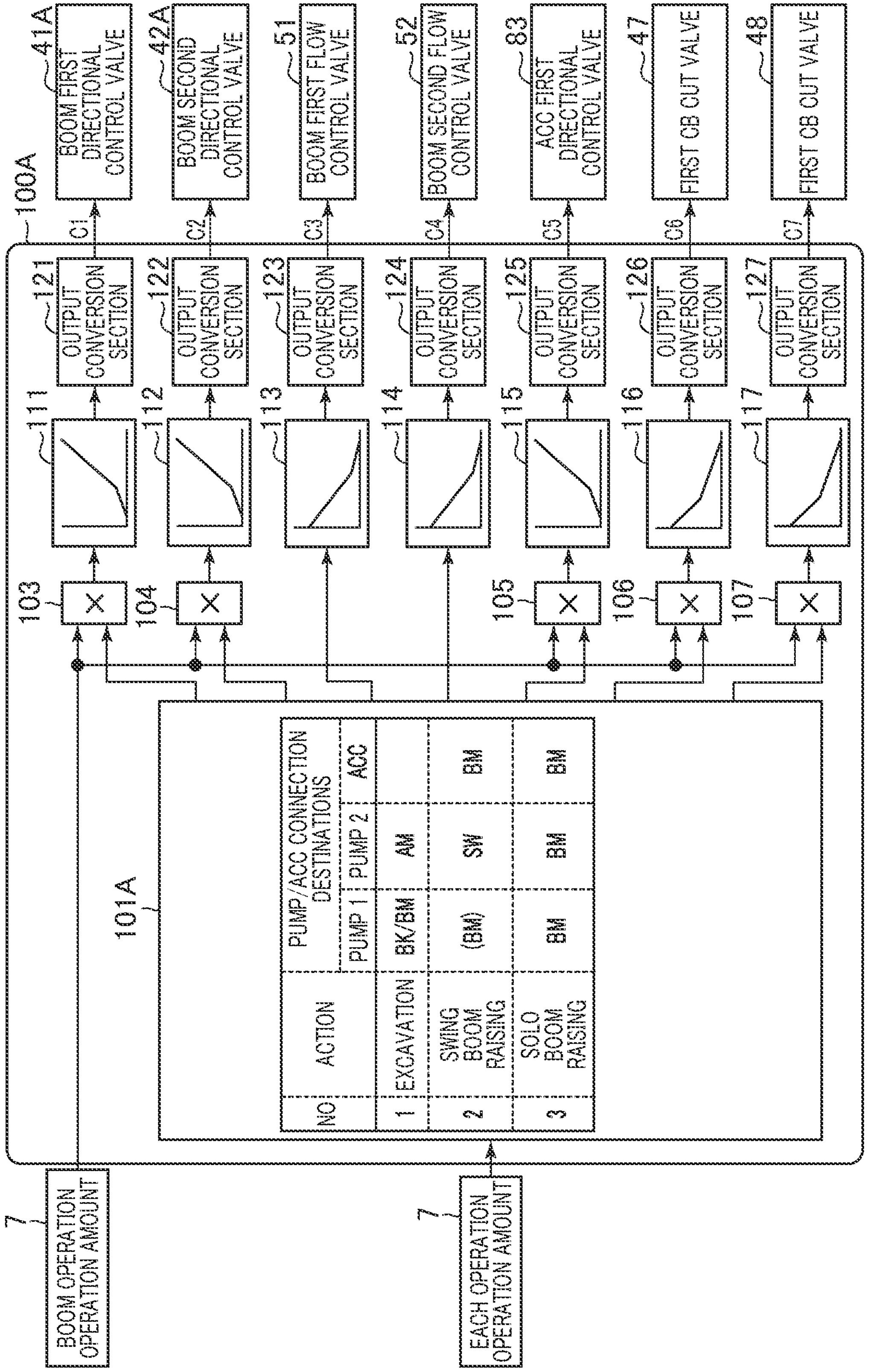
FIG. 10 is a block diagram for illustrating control logic of a controller for the hydraulic system according to the second embodiment illustrated in FIG. 8.

A description is now given of a second embodiment of the work machine according to the present invention with reference to FIG. 8 to FIG. 10. Note that, in FIG. 8 to FIG. 10, reference characters same as the reference characters illustrated in FIG. 1 to FIG. 7 denote similar portions, and hence, a detailed description thereof is omitted. FIG. 8 is a hydraulic circuit diagram for illustrating a structure of a hydraulic system provided in the work machine according to the second embodiment of the present invention.

The second embodiment of the work machine according to the present invention is different from the first embodiment in a point that the opening characteristic of each of directional control valves 41A, 42A, 43A, 44A, 45A, and 46A of a hydraulic system 30A illustrated in FIG. 8 is different, and in a point that a control method of a controller 100A illustrated in FIG. 10 for the hydraulic system 30A is different according to the difference in the opening characteristic of each of the directional control valves 41A to 46A.

Specifically, each of the directional control valves 41A to 46A has such a characteristic that the center bypass passage is not closed even when the position of the spool is switched. Each of the directional control valves 41A to 46A has, for example, an opening characteristic illustrated in FIG. 9. FIG. 9 is an opening area diagram of each of the directional control valves 41A to 46A of the hydraulic system 30A illustrated in FIG. 8. In FIG. 9, a horizontal axis S3 represents the spool stroke, and a vertical axis A3 represents the opening area of each of the passages being the meter-in passage, the meter-out passage, and the center bypass passage. A solid line represents the characteristic diagram of the meter-in passage, a broken line represents the characteristic diagram of the meter-out passage, and a one-dot chain line represents the characteristic diagram of the center bypass passage.

The spool stroke (spool position) of each of the directional control valves 41A to 46A has such a characteristic as increasing in proportion to the operation amount of each operation of the operation device 7, as in the case of the directional control valves 41 to 46 according to the first embodiment. The meter-in passage and the meter-out passage are structured in advance such that the meter-in passage and the meter-out passage simultaneously start to open at a predetermined spool stroke (predetermined spool position) and the opening areas gradually increase as the spool stroke increases from the predetermined spool stroke, as in the case of the first embodiment. Meanwhile, the opening area of the center bypass passage is constant independently of the increase and the decrease in the spool stroke, which is different from the case of the first embodiment. That is, each of the directional control valves 41A to 46A has the opening characteristic that an opening amount to the first center bypass line 37 or the second center bypass line 38 (opening area on the center bypass passage) is constant over the entire stroke.

A description is now given of control logic of the controller of the work machine according to the second embodiment with reference to FIG. 10. FIG. 10 is a block diagram for illustrating the control logic of the controller for the hydraulic system illustrated in FIG. 8.

The controller 100A controls the flow of the pressurized fluid in the first center bypass line 37 which connects the first pump 31 and the tank 34 to each other by only the first CB cut valve 47 and controls the flow of the pressurized fluid in the second center bypass line 38 which connects the second pump 32 and the tank 34 to each other by only the second CB cut valve 48, in correspondence to the structure that the opening area of the center bypass passage of each of the directional control valves 41A to 46A is constant over the entire spool stroke. The controller 100A illustrated in FIG. 10 has, as the control targets, the first CB cut valve 47 and the second CB cut valve 48 in addition to the control valves 41, 42, 51, 52, and 83 in the case of the first embodiment. That is, the controller 100A outputs a first cut control command C6 for commanding the drive of the first CB cut valve 47 and a second cut control command C7 for commanding the drive of the second CB cut valve 48 in addition to the control commands C1 to C5 in the case of the first embodiment. The control logic of the controller 100A for the control valves 41A, 42A, 51, 52, and 83 being the control targets in the case of the first embodiment is similar to that in the case of the first embodiment, and hence, a description thereof is omitted.

In the first embodiment, when the hydraulic actuators 21, 22, 23, and 5 are driven by only the pressurized fluid from the accumulator 78, the return fluid of the hydraulic actuators 21, 22, 23, and 5 is introduced to the tank 34 via the directional control valves 41 to 46 by executing control of driving the directional control valves 41 to 46 such that the meter-out sides of the hydraulic actuators 21, 22, 23, and 5 are connected to the tank 34, while the supply of the pressurized fluid from the first pump 31 or the second pump 32 to the hydraulic actuators 21, 22, 23, and 5 via the directional control valves 41 to 46 is interrupted by also driving the flow control valves 51 to 56 corresponding to the driven directional control valves 41 to 46 and controlling the flow control valves 51 to 56 to eventually close. At this time, the opening area of the center bypass passage of each of the directional control valves 41 to 46 according to the first embodiment decreases according to the drive (length of the spool stroke) (see FIG. 4), and hence, this causes an unintended increase in pressure of the first pump 31 or the second pump 32, and there is the possibility that an unnecessary pressure loss occurs.

Meanwhile, in the present embodiment, as illustrated in FIG. 9, the opening area of the center bypass passage of each of the directional control valves 41A to 46A is constant over the entire spool stroke. Thus, in the case in which the hydraulic actuators 21, 22, 23, and 5 are driven by only the pressurized fluid of the accumulator 78, even when the directional control valves 41A to 46A are driven such that the meter-out sides of the hydraulic actuators 21, 22, 23, and 5 are connected to the tank 34 (even when the meter-out passages of the directional control valves 41A to 46A are controlled to open), the connection between the first pump 31 or the second pump 32 and the tank 34 via the first center bypass line 37 or the second center bypass line 38 can be secured by controlling the first CB cut valve 47 and the second CB cut valve 48 to open. As a result, it is possible to suppress the unnecessary pressure loss caused by the unintended pressure increase in the first pump 31 or the second pump 32 in the case in which the hydraulic actuators 21, 22, 23, and 5 are driven by only the pressurized fluid of the accumulator 78.

Moreover, in the case in which the hydraulic actuators 21, 22, 23, and 5 are driven by the pressurized fluid of the first pump 31 or the second pump 32, even when the directional control valves 41A to 46A are driven such that the meter-in sides of the hydraulic actuators 21, 22, 23, and 5 are connected to the first pump 31 or the second pump 32 (even when the directional control valves 41A to 46A are controlled such that the meter-in passages open), the connection between the first pump 31 or the second pump 32 and the tank 34 via the directional control valves 41A to 46A are maintained. To avoid this, the connection between the first pump 31 or the second pump 32 and the tank 34 is interrupted by controlling the first CB cut valve 47 and the second CB cut valve 48 to close, to thereby enabling the supply of the pressurized fluid from the first pump 31 or the second pump 32 to the hydraulic actuators 21, 22, 23, and 5 via the directional control valves 41A to 46A.

Specifically, the control logic of the controller 100A includes multiplication sections 106 and 107, function generation sections 116 and 117, and output conversion sections 126 and 127 for the first CB cut valve 47 and the second CB cut valve 48 in addition to the multiplication sections 103 to 105, the function generation sections 111 to 115, and the output conversion sections 121 to 125 in the case of the first embodiment, as illustrated in FIG. 10. Moreover, an action pattern computation section 101A of the controller 100A not only sets the drive state of each of the control valves 41, 42, 51, 52, and 83 being the control targets according to the first embodiment but also sets drive states of the first CB cut valve 47 and the second CB cut valve 48 according to an action pattern identified on the basis of the operation signal of each operation from the operation device 7. The action pattern computation section 101A outputs a set result being “0” in the case of not driving or “1” in the case of driving, as the drive states of the first CB cut valve 47 and the second CB cut valve 48 to the multiplication section 106 and the multiplication section 107.

When the identification result of the action pattern is the excavation action, the action pattern computation section 101A sets such a drive state as to restrict the opening of the first CB cut valve 47 in order to supply the pressurized fluid of the first pump 31 to the boom cylinder 21 and the bucket cylinder 23. Similarly, the action pattern computation section 101A sets such a drive state as to restrict the opening of the second CB cut valve 48 in order to supply the pressurized fluid of the second pump 32 to the arm cylinder 22. That is, the action pattern computation section 101A outputs “1” in the case of driving to the multiplication sections 106 and 107.

In the case of the swing boom raising action, the action pattern computation section 101A sets such a drive state as to restrict the opening of the second CB cut valve 48 in order to supply the pressurized fluid of the second pump 32 to the swing hydraulic motor 5. Meanwhile, since the pressurized fluid of the first pump 31 is not used to drive the hydraulic actuator, it is required to secure the connection between the first pump 31 and the tank 34 via the first center bypass line 37. Hence, the action pattern computation section 101A sets such a drive state as to maintain the opening of the first CB cut valve 47. That is, the action pattern computation section 101A outputs “0” in the case of not driving to the multiplication section 106 and outputs “1” in the case of driving to the multiplication section 107.

In the case of the solo boom raising action, the action pattern computation section 101A sets such a drive state as to restrict the openings of the first CB cut valve 47 and the second CB cut valve 48 in order to supply the pressurized fluid of the first pump 31 and the second pump 32 to the boom cylinder 21. That is, the action pattern computation section 101A outputs "1" in the case of driving to the multiplication sections 106 and 107.

The multiplication section 106 and the multiplication section 107 for the first CB cut valve 47 and the second CB cut valve 48 each multiply the operation signal of the boom operation of the operation device 7 and the set result of the drive state of the first CB cut valve 47 or the second CB cut valve 48 set by the action pattern computation section 101A by each other. The multiplication results are output to the function generation section 116 and the function generation section 117 for the first CB cut valve 47 and the second CB cut valve 48. That is, the multiplication section 106 and the multiplication section 107 output, to the function generation section 116 and the function generation section 117, the same values as those of the operation signals of the boom operation of the operation device 7 when the first CB cut valve 47 and the second CB cut valve 48 are driven, and the value (signal) of "0" when the first CB cut valve 47 and the second CB cut valve 48 are not driven.

The function generation section 116 and the function generation section 117 calculate opening arears of the first CB cut valve 47 and the second CB cut valve 48 corresponding to the output (multiplication results) of the multiplication section 106 and the multiplication section 107. The calculation results are output to the output conversion section 126 and the output conversion section 127 for the first CB cut valve 47 and the second CB cut valve 48. The first CB cut valve 47 and the second CB cut valve 48 are controlled such that the opening areas decrease as the operation amount of the boom operation increases.

The output conversion section 126 and the output conversion section 127 are computation sections which convert the opening areas of the first CB cut valve 47 and the second CB cut valve 48 being the output (calculation results) of the function generation section 116 and the function generation section 117 into the displacement amounts (strokes). The computation results are output, as the first cut control command C6 and the second cut control command C7, to the first CB cut valve 47 and the second CB cut valve 48. As a result, the first CB cut valve 47 and the second CB cut valve 48 are controlled to achieve the desired strokes and opening areas.

A description is now given of the action of the work machine according to the second embodiment with reference to FIG. 8 and FIG. 10.

When the controller 100A illustrated in FIG. 10 makes the identification of the "excavation action" on the basis of the operation signal of each operation of the operation device 7, the controller 100A executes control of driving the boom first directional control valve 41A and the bucket directional control valve 45A illustrated in FIG. 8 and executes control of driving the arm second directional control valve 44A, as in the case of the first embodiment. In the case of the present embodiment, the controller 100A simultaneously executes control of driving the first CB cut valve 47 and the second CB cut valve 48, to thereby restrict the openings of the first CB cut valve 47 and the second CB cut valve 48.

As a result, the outflow of the pressurized fluid from the first pump 31 to the tank 34 is restricted by the first CB cut valve 47, thereby supplying the pressurized fluid of the first pump 31 to the boom cylinder 21 via the boom first flow control valve 51 and the boom first directional control valve 41A and supplying the pressurized fluid to the bucket cylinder 23 via the bucket flow control valve 55 and the bucket directional control valve 45A. Moreover, the outflow of the pressurized fluid from the second pump 32 to the tank 34 is restricted by the second CB cut valve 48, thereby supplying the pressurized fluid of the second pump 32 to the arm cylinder 22 via the arm second flow control valve 54 and the arm second directional control valve 44A.

Moreover, when the controller 100A makes the identification of the "swing boom raising action," the controller 100A executes control of driving the swing directional control valve 46A and executes control of driving the ACC first directional control valve 83, as in the case of the first embodiment. Further, the controller 100A executes control of driving the boom first directional control valve 41A and executes control of driving the boom first flow control valve 51 (to close the opening). In the case of the present embodiment, simultaneously, the controller 100A executes control of driving the second CB cut valve 48, thereby restricting the opening of the second CB cut valve 48 while not driving the first CB cut valve 47, thereby maintaining the opening of the first CB cut valve 47.

As a result, the outflow of the pressurized fluid from the second pump 32 to the tank 34 is restricted by the second CB cut valve 48, thereby supplying the pressurized fluid of the second pump 32 to the swing hydraulic motor 5 via the swing flow control valve 56 and the swing directional control valve 46A. Moreover, while the pressurized fluid of the accumulator 78 is supplied to the boom cylinder 21 via the ACC first directional control valve 83, the return fluid of the boom cylinder 21 is introduced from the boom first actuator line 61 to the tank 34 by the boom first return line 71 via the boom first directional control valve 41A. At this time, while the flow of the pressurized fluid from the first pump 31 to the boom cylinder 21 via the boom first directional control valve 41A is eventually interrupted by the boom first flow control valve 51, the flow of the pressurized fluid from the first pump 31 to the tank 34 via the boom first directional control valve 41A is hardly restricted by the first CB cut valve 47. Thus, the pressure loss caused by the increase in the delivery pressure of the first pump 31 as in the case of the first embodiment can be suppressed.

Moreover, when the controller 100A makes the identification of the "solo boom raising action," the controller 100A executes control of driving the boom first directional control valve 41A, the boom second directional control valve 42A, and the ACC first directional control valve 83, as in the case of the first embodiment. In the case of the present embodiment, simultaneously, the openings of the first CB cut valve 47 and the second CB cut valve 48 are restricted by executing control of driving the first CB cut valve 47 and the second CB cut valve 48.

As a result, the outflow of the pressurized fluid from the first pump 31 and the second pump 32 to the tank 34 is restricted by the first CB cut valve 47 and the second CB cut valve 48, thereby supplying the pressurized fluid of the first pump 31 and the second pump 32 to the boom cylinder 21 via the boom first directional control valve 41A and the boom second directional control valve 42A. Moreover, the pressurized fluid of the accumulator 78 is supplied to the boom cylinder 21 via the ACC first directional control valve 83.

With the second embodiment of the work machine according to the present invention described above, as in the case of the first embodiment, when the pressurized fluid is supplied from only the accumulator 78 to the hydraulic actuators 21, 22, 23, and 5, the meter-out sides of the hydraulic actuators 21, 22, 23, and 5 and the tank 34 are connected to each other by the drive of the directional control valves 41A to 46A (first control valve), and the flows of the pressurized fluid from the first pump 31 and the second pump 32 (hydraulic pump) to the hydraulic actuators 21, 22, 23, and 5 via the directional control valves 41A to 46A (first control valve) are interrupted by the drive of the flow control valves 51 to 56 (flow control mechanism). Hence, the return fluid of the hydraulic actuators 21, 22, 23, and 5 can be discharged to the tank 34 via the directional control valves 41A to 46A (first control valve) even when the pressurized fluid is supplied from the accumulator 78 to the hydraulic actuators 21, 22, 23, and 5. That is, the control of the flows of the meter-out sides of the hydraulic actuators 21, 22, 23, and 5 can be achieved by only the directional control valves 41A to 46A (first control valve). Thus, it is not required to provide a circuit for the meter-out such as a return hydraulic line and a flow control valve to the directional control valves 83 to 86 (second control valve), and hence, it is possible to suppress the increase in complexity of the structure in the hydraulic system 30A capable of supplying the pressurized fluid from the accumulator 78, in addition to the first pump 31 and the second pump 32 (hydraulic pump), to the hydraulic actuators 21, 22, 23, and 5.

Moreover, in the present embodiment, the directional control valves 41A to 46A (first control valve) are the control valves provided on the first center bypass line 37 and the second center bypass line 38 (center bypass line) which connect the first pump 31 and the second pump 32 (hydraulic pump) and the tank 34 to each other, and have such an opening characteristic that the opening amounts to the first center bypass line 37 and the second center bypass line 38 (center bypass line) are constant over the entire stroke. Moreover, the hydraulic excavator (work machine) includes the first CB cut valve 47 and the second CB cut valve 48 (center bypass cut valve) which are provided on the downstream side of the directional control valves 41A to 46A (first control valve) on the first center bypass line 37 and the second center bypass line 38 (center bypass line) and control the flow rates of the pressurized fluid flowing through the first center bypass line 37 and the second center bypass line 38. Further, the controller 100A is configured to drive the first CB cut valve 47 and the second CB cut valve 48 (center bypass cut valve) in such a manner as to maintain the flows of the pressurized fluid through the first center bypass line 37 and the second center bypass line 38 when the pressurized fluid is supplied from the accumulator 78 to the hydraulic actuators 21, 22, 23, and 5, and to drive the directional control valves 41A to 46A (first control valve) in such a manner as to connect the meter-in sides of the hydraulic actuators 21, 22, 23, and 5 and the first pump 31 and the second pump 32 (hydraulic pump) to each other and drive the first CB cut valve 47 and the second CB cut valve 48 (center bypass cut valve) in such a manner as to restrict the flows of the pressurized fluid through the first center bypass line 37 and the second center bypass line 38 (center bypass line) when the pressurized fluid is supplied from the first pump 31 and the second pump 32 (hydraulic pump) to the hydraulic actuators 21, 22, 23, and 5.

With this configuration, when the directional control valves 41A to 46A are driven such that the meter-out sides of the hydraulic actuators 21, 22, 23, and 5 are connected to the tank 34, the connection between the first pump 31 and the second pump 32 and the tank 34 via the directional control valves 41A to 46A can be secured by controlling the first CB cut valve 47 and the second CB cut valve 48 to open. As a result, it is possible to suppress the pressure loss caused by the unintended pressure increase in the first pump 31 or the second pump 32 in the case in which the hydraulic actuators 21, 22, 23, and 5 are driven by only the pressurized fluid of the accumulator 78.

Third Embodiment

Figure 11:
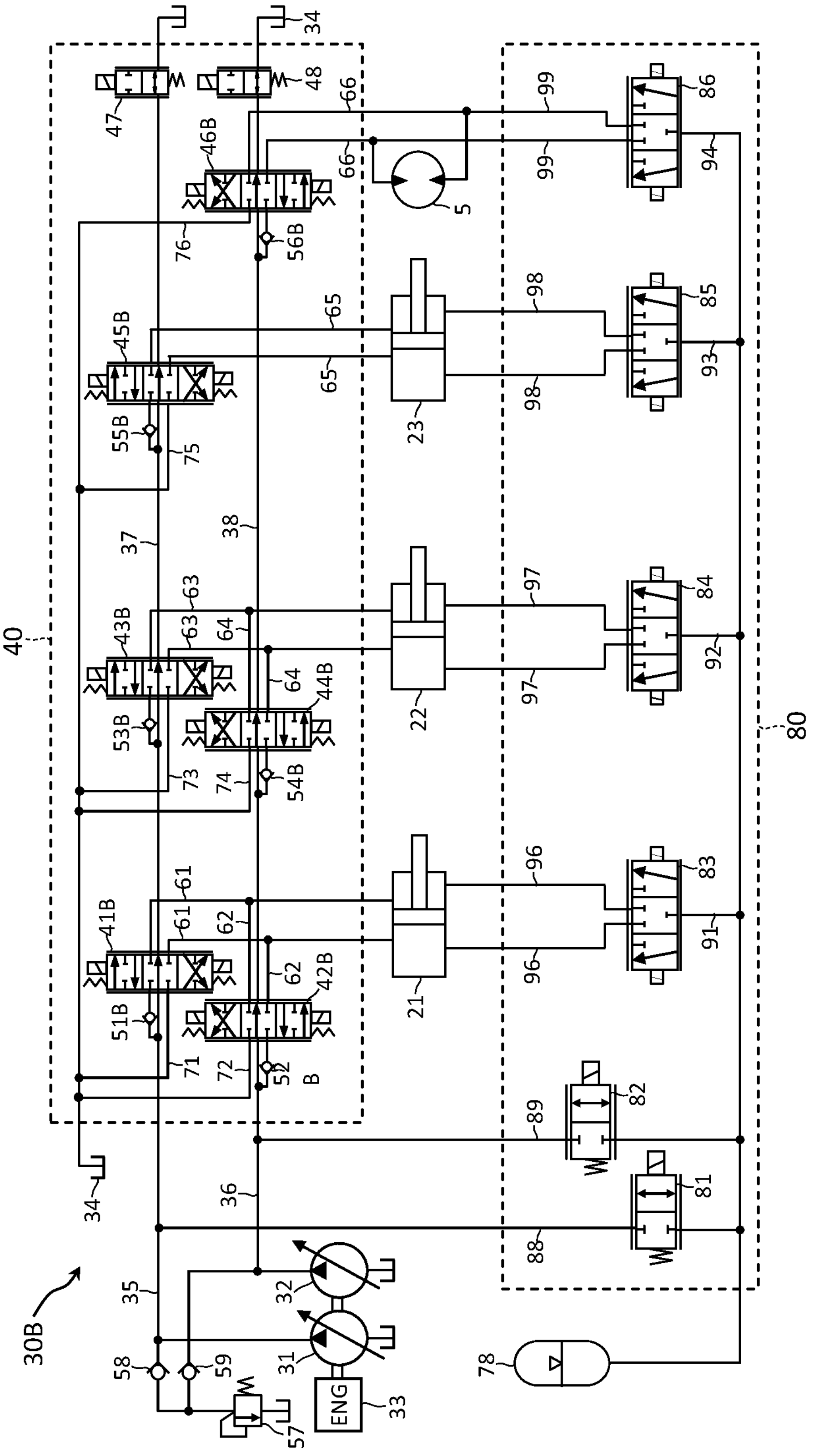
FIG. 11 is a hydraulic circuit diagram for illustrating a structure of a hydraulic system provided in the work machine according to a third embodiment of the present invention.

A description is now given of a third embodiment of the work machine according to the present invention with reference to FIG. 11 to FIG. 14. Note that, in FIG. 11 to FIG. 14, reference characters same as the reference characters illustrated in FIG. 1 to FIG. 10 denote similar portions, and hence, a detailed description thereof is omitted. FIG. 11 is a hydraulic circuit diagram for illustrating a structure of a hydraulic system provided in the work machine according to the third embodiment of the present invention.

The third embodiment of the work machine according to the present invention is different from the first embodiment mainly in the following three points. First, in a hydraulic system 30B illustrated in FIG. 11, the opening characteristic (opening characteristics of the meter-in passage, the meter-out passage, and the center bypass passage) of each of the directional control valves 41B, 42B, 43B, 44B, 45B, and 46B is different. Secondly, in the hydraulic system 30B illustrated in FIG. 11, the flow control valves 51, 52, 53, 54, 55, and 56 (see FIG. 2) according to the first embodiment are replaced with load check valves 51B, 52B, 53B, 54B, 55B, and 56B which interrupt the flow of the pressurized fluid from the hydraulic actuators 21, 22, 23, and 5 to the first pump 31 or the second pump 32. Thirdly, control of a controller 100B illustrated in FIG. 13 for the hydraulic system 30B is changed according to the difference in the opening characteristic of the directional control valves 41B to 46B and the replacement with the load check valves 51B to 56B.

Specifically, each of the directional control valves 41 to 46 according to the first embodiment has such an opening characteristic that the position (stroke) at which the meter-in passage starts to open and the position (stroke) at which the meter-out passage starts to open are the same (see FIG. 4). In contrast, each of the directional control valves 41B to 46B in the hydraulic system 30B according to the present embodiment has such an opening characteristic that the meter-out passage largely opens before the meter-in passage opens.

Figure 12:
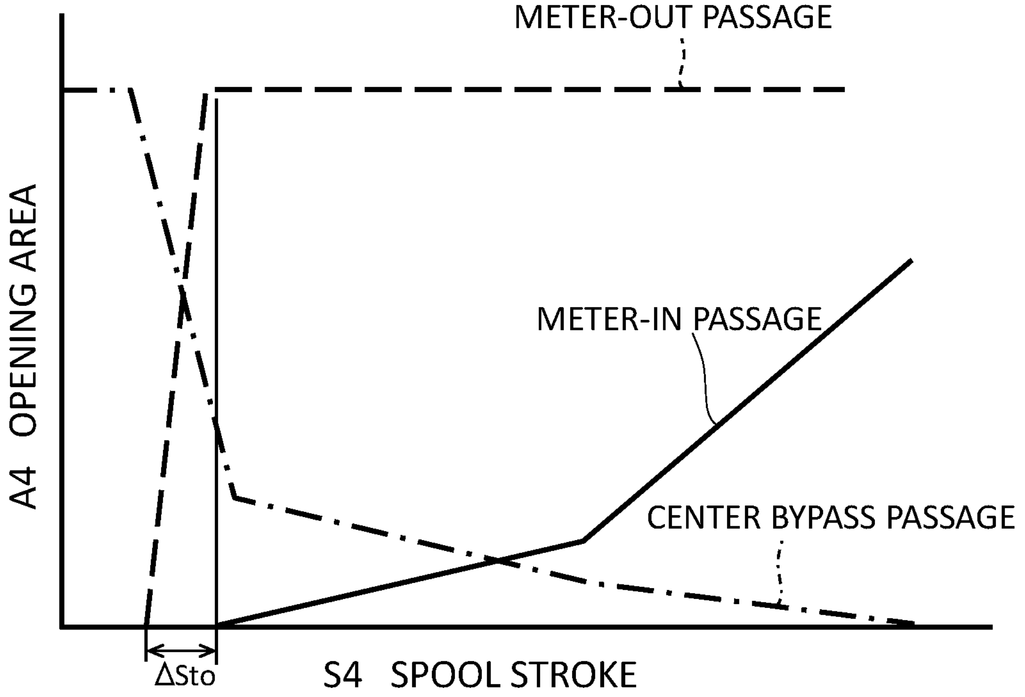
FIG. 12 is an opening area diagram of a pump directional control valve of the hydraulic system according to the third embodiment illustrated in FIG. 11.

Each of the directional control valves 41B to 46B has, for example, an opening characteristic illustrated in FIG. 12. FIG. 12 is an opening area diagram of each of the directional control valves 41B to 46B of the hydraulic system 30B illustrated in FIG. 11. In FIG. 12, a horizontal axis S4 represents the spool stroke, and a vertical axis A4 represents the opening area of each of the passages being the meter-in passage, the meter-out passage, and the center bypass passage. A solid line represents a characteristic diagram of the meter-in passage, a broken line represents a characteristic diagram of the meter-out passage, and a one-dot chain line represents a characteristic diagram of the center bypass passage.

The spool stroke (spool position) of each of the directional control valves 41B to 46B has such a characteristic as increasing in proportion to the operation amount of each operation of the operation device 7, as in the case of each of the directional control valves 41 to 46 according to the first embodiment. The center bypass passage is structured such that the opening area is restricted as the spool stroke increases, as in the case of the first embodiment. The meter-in passage is structured in advance such that the meter-in passage starts to open at a predetermined spool stroke (predetermined spool position) and the opening area gradually increases as the spool stroke increases from the predetermined spool stroke, as in the case of the first embodiment. To the meter-out passage, unlike the case of the first embodiment, a predetermined spool stroke different from the predetermined spool stroke described above is set such that the meter-out passage starts to open before the meter-in passage opens as the spool stroke increases, and the opening area steeply increases with respect to the increase in spool stroke. The meter-out passage is structured such that the opening area is maintained constant to the maximum value at the stroke in the state in which the meter-in passage is open. That is, the opening characteristic of each of the directional control valves 41B to 46B is such that the meter-out passage is in the open state while the meter-in passage is in the closed state when the stroke is within a predetermined range ΔSto. Further, when the stroke is longer than this predetermined range ΔSto, both the meter-in passage and the meter-out passage are in the open state.

In the directional control valves 41B to 46B each having such an opening characteristic, only the meter-out sides of the hydraulic actuators 21, 22, 23, and 5 can be connected to the tank 34 without connecting the meter-in sides to the first pump 31 or the second pump 32 when the stroke is within the predetermined range ΔSto. Thus, in the case in which only the pressurized fluid of the accumulator 78 is supplied to the hydraulic actuators 21, 22, 23, and 5, even when the directional control valves 41B to 46B are driven such that the meter-out sides of the hydraulic actuators 21, 22, 23, and 5 and the tank 34 are connected to each other, it is possible to interrupt the supply of the pressurized fluid from the first pump 31 or the second pump 32 to hydraulic actuators 21, 22, 23, and 5 via the directional control valves 41B to 46B without using the flow control valves 51 to 56 used in the first embodiment.

Figure 13:
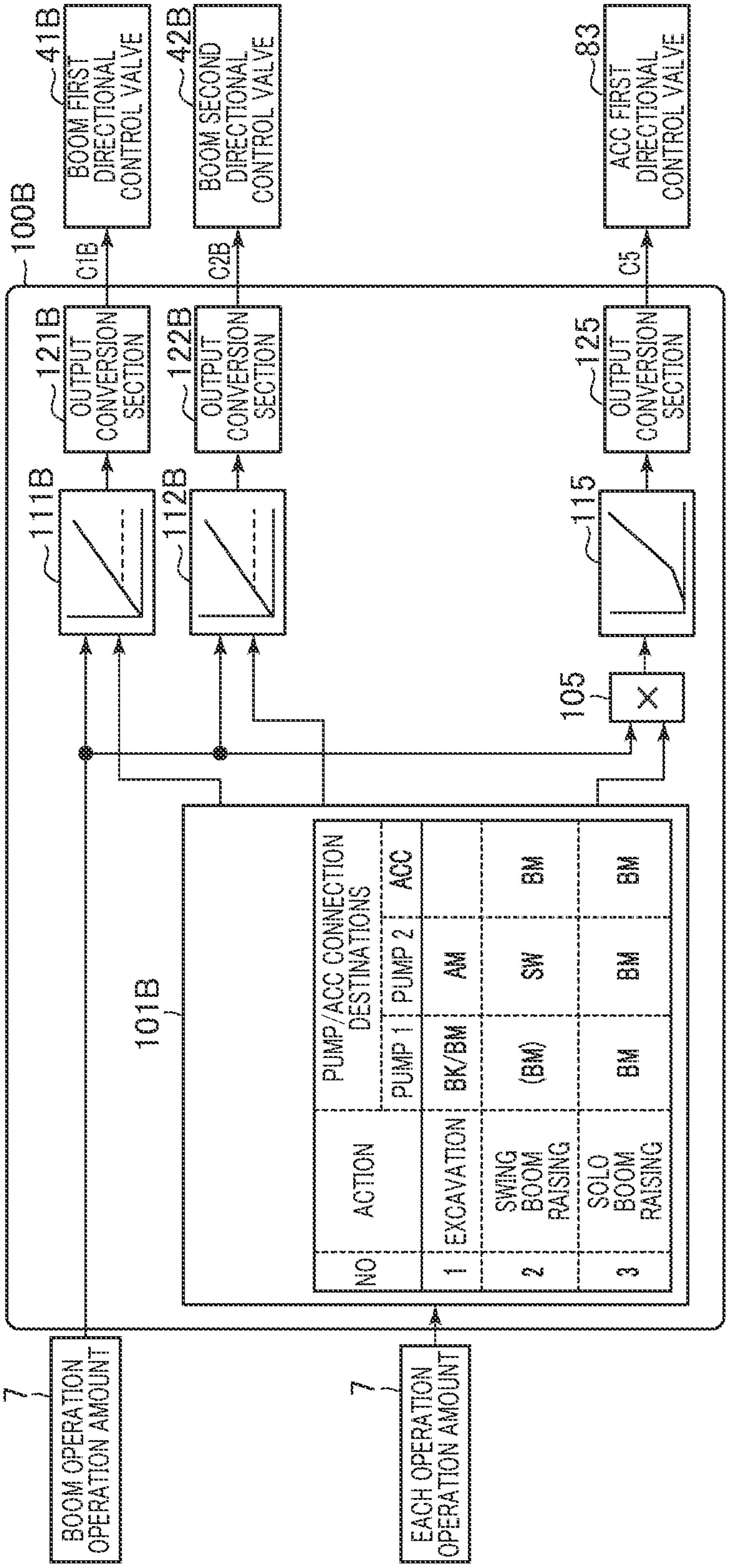
FIG. 13 is a block diagram for illustrating control logic of a controller for the hydraulic system according to the third embodiment illustrated in FIG. 11.
Figure 14:
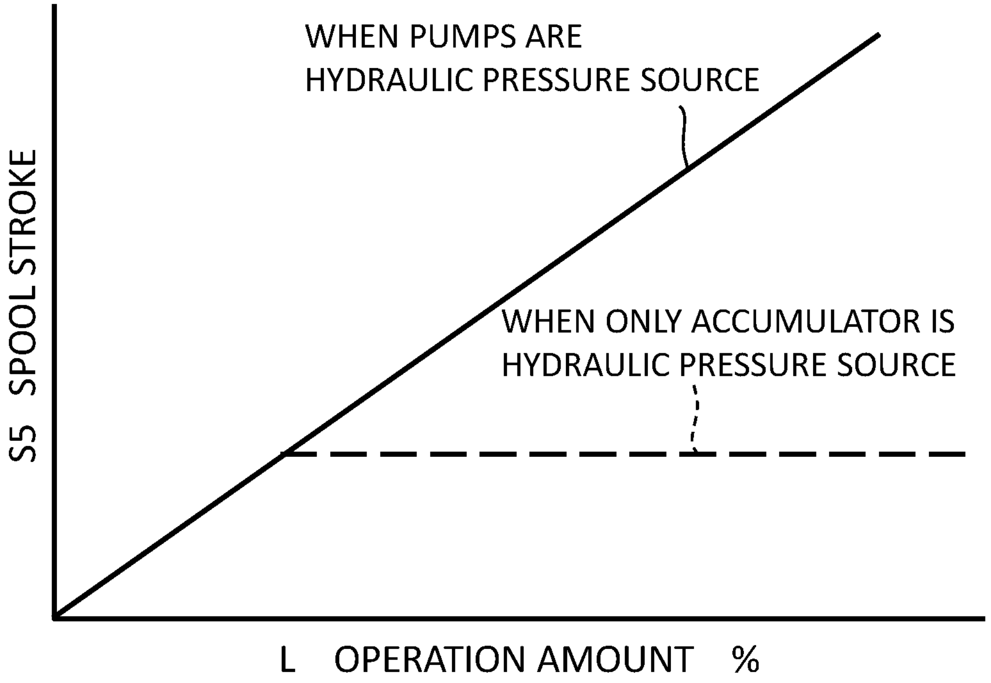
FIG. 14 is a characteristic diagram used by a function generation section of the controller according to the third embodiment illustrated in FIG. 13.

A description is now given of control logic of the controller of the work machine according to the third embodiment with reference to FIG. 13 and FIG. 14. FIG. 13 is a block diagram for illustrating the control logic of the controller for the hydraulic system according to the third embodiment illustrated in FIG. 11.

The control logic of the controller 100B according to the third embodiment illustrated in FIG. 13 is different from that according to the first embodiment in the following points. First, in the control logic of the controller 100B, the control of the flow control valves 51 and 52 according to the first embodiment (see FIG. 3) is not required as a result of the replacement of the flow control valves 51 and 52 with the load check valves 51B and 52B. That is, the control logic of the controller 100B illustrated in FIG. 13 has such a structure that the function generation sections 113 and 114 and the output conversion sections 123 and 124 for the flow control valves 51 and 52 in the control logic of the controller 100 illustrated in FIG. 6 are removed. Secondly, the drive for each action pattern of the hydraulic excavator in the directional control valves 41B and 42B is changed according to the opening characteristic described above. In details, in the control logic of the controller 100B illustrated in FIG. 13, the multiplication sections 103 and 104 for the directional control valves 41 and 42 in the control logic of the controller 100 illustrated in FIG. 6 are removed, and the function generation sections 111 and 112 for the directional control valves 41 and 42 are changed to function generation sections 111B and 112B different in characteristic. Thirdly, an output of an action pattern computation section 101B is changed in response to the removal of the multiplication sections 103 and 104 and the function generation sections 113 and 114 according to the first embodiment illustrated in FIG. 6 and the change of the function generation sections 111 and 112 to the function generation sections 111B and 112B. Note that the multiplication section 105, the function generation section 115, and the output conversion section 125 for the ACC first directional control valve 83 are similar to those in the case of the first embodiment.

The action pattern computation section 101B outputs, in place of outputting the settings ("1" in the case of driving or "0" in the case of not driving) for whether or not the directional control valves 41B and 42B are driven, to the function generation sections 111B and 112B for the directional control valves 41B and 42B, a setting result of the hydraulic fluid source for the hydraulic actuator (boom cylinder 21) corresponding to the directional control valves 41B and 42B according to the identified action pattern. That is, the action pattern computation section 101B sets only the first pump 31 to the hydraulic fluid source for the boom cylinder 21 when the identification result of the action pattern is the excavation action. The action pattern computation section 101B sets only the accumulator 78 to the hydraulic fluid source for the boom cylinder 21 when the identification result of the action pattern is the swing boom raising action. The action pattern computation section 101B sets the first pump 31, the second pump 32, and the accumulator 78 to the hydraulic fluid source for the boom cylinder 21 when the identification result of the action pattern is the solo boom raising action. The setting result of the hydraulic fluid source output from the action pattern computation section 101B is used to switch between two characteristics described later of the function generation sections 111B and 112B.

Each of the function generation sections 111B to 112B has, for example, a characteristic illustrated in FIG. 14. FIG. 14 is a characteristic diagram used by the function generation sections 111B and 112B of the controller 100B illustrated in FIG. 13. In FIG. 14, a horizontal axis L represents an operation amount (%) of the operation device, and a vertical axis S5 represents the spool stroke of each of the directional control valves 41B and 42B.

Each of the function generation sections 111B and 112B has the two different characteristics and is configured to be switched to one of the two characteristics according to the setting result for the hydraulic fluid source for the hydraulic actuator (boom cylinder 21) being the output of the action pattern computation section 101B. A characteristic diagram in a solid line is used when the first pump 31 or the second pump 32 is set as the hydraulic fluid source for the hydraulic actuators 21, 22, 23, and 5. This characteristic diagram has such a characteristic that the spool stroke increases in proportion to an increase in the operation amount of the operation device 7. A characteristic diagram in a broken line is used when only the accumulator 78 is set as the hydraulic fluid source for the hydraulic actuators 21, 22, 23, and 5. This characteristic diagram has such a characteristic that the spool stroke increases to a predetermined spool stroke as the operation amount of the operation device 7 increases, but the spool stroke is subsequently limited and is constant. This limit of the spool stroke means that the directional control valves 41B and 42B are driven at the spool stroke within the predetermined range ΔSto in the opening characteristic of the directional control valves 41B and 42B illustrated in FIG. 12. This is for controlling each of the directional control valves 41B and 42B such that only the meter-out passage of each of the directional control valves 41B and 42B is in the open state while the meter-in passage is kept in the closed state.

Each of the function generation sections 111B and 112B selects the characteristic diagram according to the output (the setting result for the hydraulic fluid source for the hydraulic actuator 21) of the action pattern computation section 101B and uses the selected characteristic diagram to calculate the spool stroke of each of the directional control valves 41B and 42B on the basis of the operation amount of the boom operation output from the operation device 7. The spool strokes being the calculation results are output to the output conversion sections 121B and 122B.

The output conversion sections 121B and 122B are computation sections which convert the spool strokes (spool displacement amounts) of the directional control valves 41B and 42B being the output (calculation results) of the function generation sections 111B and 112B into command values (for example, current values) for the directional control valves 41B and 42B. The computation result is output, as a boom first directional control command C1B and a boom second directional control command C2B, to the boom first directional control valve 41B and the boom second directional control valve 42B. As a result, the boom first directional control valve 41B and the boom second directional control valve 42B can be controlled to achieve desired strokes and opening areas.

A description is now given of the action of the work machine according to the third embodiment with reference to FIG. 11 to FIG. 14.

When the action pattern computation section 101B of the controller 100B illustrated in FIG. 13 makes the identification of the "excavation action" on the basis of the operation signal of each operation of the operation device 7, the action pattern computation section 101B sets the first pump 31 as the hydraulic fluid source of the boom cylinder 21. The function generation section 111B selects the characteristic diagram for the pump (the characteristic diagram in the solid line), of the two characteristic diagrams illustrated in FIG. 14, on the basis of the setting result of the first pump 31 as the hydraulic fluid source for the boom cylinder 21 by the action pattern computation section 101B, and uses the selected characteristic diagram to calculate the spool stroke corresponding to the boom operation amount. The drive of the boom first directional control valve 41B is controlled by outputting the boom first directional control command C1B according to the spool stroke calculated by the function generation section 111B.

In this case, the boom first directional control valve 41B having the opening characteristic illustrated in FIG. 12 has the opening area of the meter-in passage according to the boom operation amount while having a large opening (having the maximum opening area) of the meter-out passage. Note that the center bypass passage is restricted as in the case of the first embodiment. As a result, the pressurized fluid of the first pump 31 illustrated in FIG. 11 is supplied to the boom cylinder 21 via the load check valve 51B and the boom first directional control valve 41B (meter-in passage). Simultaneously, the return fluid of the boom cylinder 21 is introduced from the boom first directional control valve 41B (meter-out passage) to the tank 34 via the boom first return line 71.

Moreover, when the action pattern computation section 101B makes the identification of the "swing boom raising action," the controller 100B sets only the accumulator 78 as the hydraulic fluid source of the boom cylinder 21. In this case, the function generation section 111B selects the characteristic diagram for the accumulator (the characteristic diagram in the broken line) illustrated in FIG. 14 on the basis of the setting result made by the action pattern computation section 101B to use only the accumulator 78 as the hydraulic fluid source, and uses the selected characteristic diagram to calculate the spool stroke corresponding to the boom operation amount. The drive of the boom first directional control valve 41B is controlled by outputting the boom first directional control command C1B according to the spool stroke calculated by the function generation section 111B.

In this case, the drive of the boom first directional control valve 41B is limited to the spool stroke within the predetermined range ΔSto in the opening characteristic illustrated in FIG. 12 by the limit of the spool stroke by the characteristic diagram in the broken line illustrated in FIG. 14. That is, the boom first directional control valve 41B is driven such that the meter-in passage is in the closed state while the meter-out passage is in the open state.

As a result, when the pressurized fluid of the accumulator 78 illustrated in FIG. 11 is supplied to the boom cylinder 21 via the ACC first directional control valve 83, the return fluid of the boom cylinder 21 is introduced from the boom first actuator line 61 to the tank 34 by the boom first return line 71 via the boom first directional control valve 41B (meter-out passage). Simultaneously, the supply of the pressurized fluid from the first pump 31 to the boom cylinder 21 is interrupted by the boom first directional control valve 41B having the meter-in passage in the closed state. Thus, unintended supply of the pressurized fluid from the first pump 31 to the boom cylinder 21 can be prevented.

Moreover, when the action pattern computation section 101B makes the identification of the "solo boom raising action," the action pattern computation section 101B sets the first pump 31, the second pump 32, and the accumulator 78 to the hydraulic fluid source for the boom cylinder 21. The function generation section 111B and the function generation section 112B select the characteristic diagram for the pump (the characteristic diagram in the solid line) on the basis of the setting result of the first pump 31 and the second pump 32 as the hydraulic fluid source for the boom cylinder 21 by the action pattern computation section 101B, and uses the selected characteristic diagram to calculate the spool strokes corresponding to the boom operation amount. The drive of the boom first directional control valve 41B and the boom second directional control valve 42B is controlled by outputting the boom first directional control command C1B and the boom second directional control command C2B according to the spool strokes calculated by the function generation section 111B and the function generation section 112B.

In this case, each of the boom first directional control valve 41B and the boom second directional control valve 42B having the opening characteristic illustrated in FIG. 12 has the opening area of the meter-in passage according to the boom operation amount while having a large opening (having the maximum opening area) of the meter-out passage. As a result, the pressurized fluid of the first pump 31 is supplied to the boom cylinder 21 via the load check valve 51B and the boom first directional control valve 41B (meter-in passage). Further, the pressurized fluid of the second pump 32 is supplied to the boom cylinder 21 via the load check valve 52B and the boom second directional control valve 42B (meter-in passage). Moreover, the pressurized fluid of the accumulator 78 is supplied to the boom cylinder 21 via the ACC first directional control valve 83. Simultaneously, the return fluid of the boom cylinder 21 is introduced from the boom first directional control valve 41B (meter-out passage)

to the tank 34 via the boom first return line 71 and is introduced from the boom second directional control valve 42B (meter-out passage) to the tank 34 via the boom second return line 72. As described above, the pressurized fluid can be supplied to the boom cylinder 21 from the three hydraulic fluid sources being the first pump 31, the second pump 32, and the accumulator 78.

With the third embodiment of the work machine according to the present invention described above, as with the case of the first embodiment, when the pressurized fluid is supplied from only the accumulator 78 to the hydraulic actuators 21, 22, 23, and 5, the meter-out sides of the hydraulic actuators 21, 22, 23, and 5 and the tank 34 are connected to each other by the drive of the directional control valves 41B to 46B (first control valve), and the flows of the pressurized fluid from the first pump 31 and the second pump 32 (hydraulic pump) to the hydraulic actuators 21, 22, 23, and 5 via the directional control valves 41B to 46B (first control valve) are interrupted by the drive of the directional control valves 41B to 46B (flow control mechanism). Hence, the return fluid of the hydraulic actuators 21, 22, 23, and 5 can be discharged to the tank 34 via the directional control valves 41B to 46B (first control valve) even when the pressurized fluid is supplied from the accumulator 78 to the hydraulic actuators 21, 22, 23, and 5. That is, the control of the flows on the meter-out sides of the hydraulic actuators 21, 22, 23, and 5 can be achieved by only the directional control valves 41B to 46B (first control valve). Thus, it is not required to provide a circuit for the meter-out such as a return hydraulic line and a flow control valve to the directional control valves 83 to 86 (second control valve), and hence, it is possible to suppress the increase in complexity of the structure in the hydraulic system 30B capable of supplying the pressurized fluid from the accumulator 78, in addition to the first pump 31 and the second pump 32 (hydraulic pump), to the hydraulic actuators 21, 22, 23, and 5.

Moreover, in the present embodiment, the meter-in passages for connecting the first pump 31 and the second pump 32 (hydraulic pump) to the hydraulic actuators 21, 22, 23, and 5 and the meter-out passages for connecting the tank 34 to the hydraulic actuators 21, 22, 23, and 5 have the specific opening characteristic, and hence, each of the directional control valves 41B to 46B (first control valve) is structured to include the flow control mechanism. The specific opening characteristic of the directional control valves 41B to 46B (first control valve) is such that the meter-in passage is in the open state while the meter-out passage is in the closed state when the stroke is within the predetermined range and both the meter-in passage and the meter-out passage are in the open state when the stroke is longer than the predetermined range.

With this structure, when the pressurized fluid is supplied from only the accumulator 78 to the hydraulic actuators 21, 22, 23, and 5, the discharge of the return fluid of the hydraulic actuators 21, 22, 23, and 5 to the tank 34 and the interruption of the flows of the pressurized fluid from the first pump 31 and the second pump 32 (hydraulic pump) to the hydraulic actuators 21, 22, 23, and 5 can be achieved by controlling only the directional control valves 41B to 46B.

Moreover, in the present embodiment, the controller 100B is configured to control the directional control valves 41B to 46B (first control valve) such that the strokes of the directional control valves 41B to 46B (first control valve) are within the predetermined range ΔSto when the pressurized fluid is supplied from only the accumulator 78 to the hydraulic actuators 21, 22, 23, and 5.

With this configuration, when only the accumulator 78 is set to the hydraulic fluid source, the discharge of the return fluid of the hydraulic actuators 21, 22, 23, and 5 to the tank 34 and the interruption of the flows of the pressurized fluid from the first pump 31 and the second pump 32 (hydraulic pump) to the hydraulic actuators 21, 22, 23, and 5 can be achieved by controlling only the directional control valves 41B to 46B, and hence, the structure of the hydraulic system 30B can be simplified compared with the case of the first embodiment.

Other Embodiments

Note that, in the first to third embodiments described above, the application of the present invention to the hydraulic excavator is exemplified, but the present invention can widely be applied to various work machines having the hydraulic systems 30, 30A, and 30B capable of supplying the pressurized fluid from the accumulator 78, in addition to the hydraulic pumps 31 and 32, to the hydraulic actuators 21, 22, 23, and 5.

Moreover, the present invention is not limited to the embodiments described above and include various modification examples. The embodiments described above are detailed for the sake of an easy-to-understand description of the present invention, and the present invention is not necessarily limited to the embodiments including all the described structures. For example, a part of a structure of a certain embodiment can be replaced with a structure of another embodiment, and, to a structure of a certain embodiment, a structure of another embodiment can be added. Moreover, for a part of a structure of each embodiment, addition, deletion, and replacement of another structure can be made.

In addition, each function of the controllers 100, 100A, and 100B according to the embodiments described above may be implemented as hardware by designing a part or the whole of them as an integrated circuit. Furthermore, information such as a program, a table, and a file for implementing each function may be stored in a recording device such as a hard disk and an SSD (Solid State Drive) or a recording medium such as an IC card, an SD card, and a DVD, in addition to the memory 100*a*.

DESCRIPTION OF REFERENCE CHARACTERS

5: Swing hydraulic motor (hydraulic actuator)
21: Boom cylinder (hydraulic actuator)
22: Arm cylinder (hydraulic actuator)
23: Bucket cylinder (hydraulic actuator)
31: First hydraulic pump (hydraulic pump)
32: Second hydraulic pump (hydraulic pump)
34: Tank
37: First center bypass line (center bypass line)
38: Second center bypass line (center bypass line)
41 to 46, 41A to 46A, 41B to 46B: Directional control valve (first control valve, flow control mechanism)
47: First center bypass cut valve (center bypass cut valve)
48: Second center bypass cut valve (center bypass cut valve)
51 to 56: Flow control valve (flow control mechanism)
83 to 86: Accumulator directional control valve (second control valve)
78: Accumulator
100, 100A, 100B: Controller

The invention claimed is:

1. A work machine comprising:

a hydraulic pump that delivers pressurized fluid;

a hydraulic actuator that is driven by the pressurized fluid delivered from the hydraulic pump;

a tank that stores return fluid discharged from the hydraulic actuator;

an accumulator that accumulates the pressurized fluid delivered from the hydraulic pump and supplies the accumulated pressurized fluid to the hydraulic actuator;

a first control valve that controls connection between a meter-in side of the hydraulic actuator and the hydraulic pump and controls connection between a meter-out side of the hydraulic actuator and the tank; and a second control valve that controls connection between the meter-in side of the hydraulic actuator and the accumulator, wherein the work machine further includes a flow control mechanism that controls a flow rate of the pressurized fluid from the hydraulic pump to the hydraulic actuator via the first control valve, and a controller configured to control the first control valve, the second control valve, and the flow control mechanism, and the controller is further configured to, when the pressurized fluid is supplied from only the accumulator to the hydraulic actuator, drive the second control valve such that the meter-in side of the hydraulic actuator and the accumulator are connected to each other, drive the first control valve to connect the meter-out side of the hydraulic actuator and the tank via the first control valve and not via the second control valve, and drive the flow control mechanism such that a flow of the pressurized fluid from the hydraulic pump to the hydraulic actuator via the first control valve is interrupted.

2. A work machine comprising:

a hydraulic pump that delivers pressurized fluid;

a hydraulic actuator that is driven by the pressurized fluid delivered from the hydraulic pump;

a tank that stores return fluid discharged from the hydraulic actuator;

an accumulator that accumulates the pressurized fluid delivered from the hydraulic pump and supplies the accumulated pressurized fluid to the hydraulic actuator;

a first control valve that controls connection between a meter-in side of the hydraulic actuator and the hydraulic pump and controls connection between a meter-out side of the hydraulic actuator and the tank; and a second control valve that controls connection between the meter-in side of the hydraulic actuator and the accumulator, wherein the work machine further includes a flow control mechanism that controls a flow rate of the pressurized fluid from the hydraulic pump to the hydraulic actuator via the first control valve, and a controller configured to control the first control valve, the second control valve, and the flow control mechanism, the controller is further configured to, when the pressurized fluid is supplied from only the accumulator to the hydraulic actuator, drive the second control valve such that the meter-in side of the hydraulic actuator and the accumulator are connected to each other, drive the first control valve such that the meter-out side of the hydraulic actuator and the tank are connected to each other, and drive the flow control mechanism such that a flow of the pressurized fluid from the hydraulic pump to the hydraulic actuator via the first control valve is interrupted, wherein the first control valve has such an opening characteristic that a predetermined stroke at which both a meter-in passage for connecting the hydraulic pump to the hydraulic actuator and a meter-out passage for connecting the tank to the hydraulic actuator start to communicate is set, and the flow control mechanism is formed of another control valve different from the first control valve.

3. The work machine according to claim 2, wherein the first control valve is a control valve provided on a center bypass line that connects the hydraulic pump and the tank to each other, the first control valve has such an opening characteristic that an opening amount to the center bypass line is constant over an entire stroke, the work machine further includes a center bypass cut valve that is provided on a downstream side of the first control valve on the center bypass line and controls a flow rate of the pressurized fluid flowing through the center bypass line, the controller is configured to drive the center bypass cut valve such that the flow of the pressurized fluid in the center bypass line is maintained when the pressurized fluid is supplied from the accumulator to the hydraulic actuator, and drive the first control valve such that the meter-in side of the hydraulic actuator and the hydraulic pump are connected to each other and drive the center bypass cut value such that the flow of the pressurized fluid in the center bypass line is restricted when the pressurized fluid is supplied from the hydraulic pump to the hydraulic actuator.

4. A work machine comprising:

a hydraulic pump that delivers pressurized fluid;

a hydraulic actuator that is driven by the pressurized fluid delivered from the hydraulic pump;

a tank that stores return fluid discharged from the hydraulic actuator;

an accumulator that accumulates the pressurized fluid delivered from the hydraulic pump and supplies the accumulated pressurized fluid to the hydraulic actuator;

a first control valve that controls connection between a meter-in side of the hydraulic actuator and the hydraulic pump and controls connection between a meter-out side of the hydraulic actuator and the tank; and a second control valve that controls connection between the meter-in side of the hydraulic actuator and the accumulator, wherein the work machine further includes a flow control mechanism that controls a flow rate of the pressurized fluid from the hydraulic pump to the hydraulic actuator via the first control valve, and a controller configured to control the first control valve, the second control valve, and the flow control mechanism, the controller is further configured to, when the pressurized fluid is supplied from only the accumulator to the hydraulic actuator, drive the second control valve such that the meter-in side of the hydraulic actuator and the accumulator are connected to each other, drive the first control valve such that the meter-out side of the hydraulic actuator and the tank are connected to each other, and drive the flow control mechanism such that a flow of the pressurized fluid from the hydraulic pump to the hydraulic actuator via the first control valve is interrupted, wherein the first control valve is structured to include the flow control mechanism by causing a meter-in passage that connects the hydraulic pump to the hydraulic actuator and a meter-out passage that connects the tank to the hydraulic actuator to have a specific opening characteristic, and the specific opening characteristic of the first control valve is such that the meter-out passage is in an open state while the meter-in passage is in a closed state when a stroke is within a predetermined range, and both the meter-in passage and the meter-out passage are in the open state when the stroke is longer than the predetermined range.

5. The work machine according to claim 4, wherein the controller is configured to control the first control valve such that the stroke of the first control valve is within the predetermined range when the pressurized fluid is supplied from only the accumulator to the hydraulic actuator.

* * * * *